US008827480B2

(12) United States Patent
Kuromizu

(10) Patent No.: US 8,827,480 B2
(45) Date of Patent: Sep. 9, 2014

(54) LIGHTING DEVICE, DISPLAY DEVICE, AND TELEVISION RECEIVER

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 404 days.

(21) Appl. No.: 13/395,463

(22) PCT Filed: Aug. 19, 2010

(86) PCT No.: PCT/JP2010/063992
§ 371 (c)(1),
(2), (4) Date: Mar. 12, 2012

(87) PCT Pub. No.: WO2011/033899
PCT Pub. Date: Mar. 24, 2011

(65) Prior Publication Data
US 2012/0169945 A1   Jul. 5, 2012

(30) Foreign Application Priority Data
Sep. 16, 2009   (JP) ................................. 2009-214953

(51) Int. Cl.
*F21V 7/22* (2006.01)
(52) U.S. Cl.
CPC ........................................ *F21V 7/22* (2013.01)
USPC ........................... 362/97.2; 362/561; 362/97.3
(58) Field of Classification Search
CPC .......... F21V 7/22; F21V 7/0005; F21V 7/005
USPC ........................................ 362/97.2, 97.3, 511
See application file for complete search history.

(56) References Cited

U.S. PATENT DOCUMENTS

| 6,357,904 B1 * | 3/2002 | Kawashima .................. 362/555 |
| 2006/0215386 A1 | 9/2006 | Hatanaka et al. |
| 2007/0086181 A1 | 4/2007 | Hatanaka et al. |
| 2009/0086121 A1 | 4/2009 | Sekiguchi et al. |
| 2009/0135331 A1 | 5/2009 | Kawase |
| 2010/0253874 A1 | 10/2010 | Ito et al. |
| 2011/0007231 A1 | 1/2011 | Takata |

FOREIGN PATENT DOCUMENTS

| DE | 198 32 665 A1 | 1/2000 |
| FR | 2 903 202 A1 | 1/2008 |
| JP | 02-037604 A | 2/1990 |

(Continued)

OTHER PUBLICATIONS

Official Communication issued in International Patent Application No. PCT/JP2010/063992, mailed on Nov. 16, 2010.

(Continued)

*Primary Examiner* — Sharon Payne
(74) *Attorney, Agent, or Firm* — Keating & Bennett, LLP

(57) ABSTRACT

Uneven brightness is less likely to occur in a backlight unit. In a backlight unit 12, suppose that a maximum value and a minimum value of light reflectance of at least a first surface 30a of a diffuser plate 30 facing a hot cathode tube 17 are defined as Rmax Rmin, respectively, a rising proximal position BP of each rising portion 20b of a reflection sheet 20 is provided to overlap with an area of the diffuser plate 30 having light reflectance R that satisfies the Expression given below, and a rising distal position EP of each rising portion 20b is provided not to overlap with an area of the diffuser plate 30 having the light reflectance R that satisfies the Expression given below.

(Rmax−Rmin)/2+Rmin<R

22 Claims, 26 Drawing Sheets

(56) References Cited

FOREIGN PATENT DOCUMENTS

| | | |
|---|---|---|
| JP | 02-253234 A | 10/1990 |
| JP | 03-238489 A | 10/1991 |
| JP | 08-029785 A | 2/1996 |
| JP | 08-184827 A | 7/1996 |
| JP | 09-236803 A | 9/1997 |
| JP | 2005-117023 A | 4/2005 |
| JP | 3894897 B2 | 3/2007 |
| WO | 2007/034595 A1 | 3/2007 |
| WO | 2007/111353 A1 | 10/2007 |
| WO | 2009/057550 A1 | 5/2009 |
| WO | 2009/110316 A1 | 9/2009 |

OTHER PUBLICATIONS

Shimizu, "Lighting Device, Display Device, and Television Receiver", U.S. Appl. No. 13/395,459, filed Mar. 12, 2012.

Kuromizu et al., "Lighting Device, Display Device and Television Receiver", U.S. Appl. No. 13/395,457, filed Mar. 12, 2012.

Kuromizu, "Lighting Device, Display Device and Television Receiver", U.S. Appl. No. 13/395,462, filed Mar. 12, 2012.

Kuromizu, "Lighting Device, Display Device and Television Receiver", U.S. Appl. No. 13/395,465, filed Mar. 12, 2012.

Kuromizu, "Lighting Device, Display Device and Television Receiver", U.S. Appl. No. 13/395,469, filed Mar. 12, 2012.

* cited by examiner

FIG.1
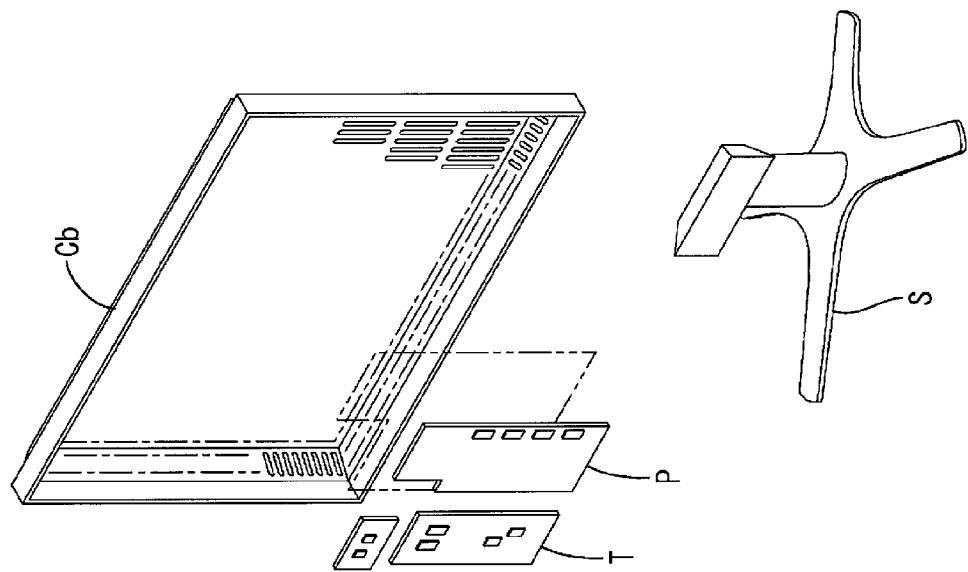
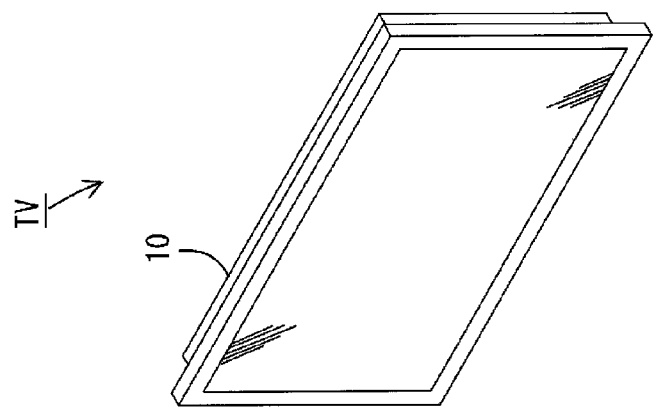
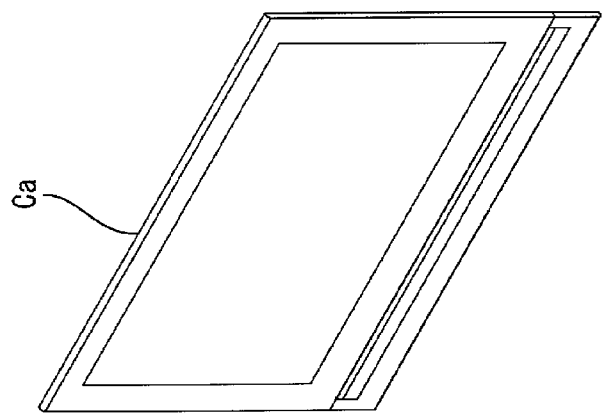

LIGHTING DEVICE, DISPLAY DEVICE, AND TELEVISION RECEIVER

TECHNICAL FIELD

The present invention relates to a lighting device, a display device, and a television receiver.

BACKGROUND ART

A liquid crystal panel included in a liquid crystal display device, such as a liquid crystal television set, does not emit light, and thus a backlight unit is required as a separate lighting device. As the backlight unit, a backlight unit installed behind the liquid crystal panel (on a side opposite from a display surface side) is well known. The backlight unit includes a chassis having an opening in the surface on the liquid crystal panel side, a number of light sources (such as cold cathode tubes) housed in the chassis as lamps, an optical member (such as a diffuser plate) arranged at the opening of the chassis to efficiently discharge light emitted from the light sources to the liquid crystal panel side, and a reflection sheet laid in the chassis to reflect the light emitted from the light sources to the optical member side and the liquid crystal panel side.

In such a backlight unit, when the light sources are configured to emit linear light, the optical member converts the linear light into planar light, thereby achieving the uniformity of illumination light. However, if the conversion into planar light is insufficient, a banded lamp image is generated along the arrangement of the light sources, which deteriorates the display quality of the liquid crystal display device.

To achieve the uniformity of the illumination light from the backlight unit, it is desirable to reduce the distance between the adjacent light sources by increasing the number of light sources to be arranged, or to increase the diffusing power of the diffuser plate, for example. However, the increase in the number of light sources leads to an increase in cost of the backlight unit and an increase in power consumption. Furthermore, the increase in the diffusion power of the diffuser plate makes it difficult to increase the brightness, resulting in a problem of the necessity to increase the number of light sources. Under such circumstances, there is known a backlight unit that maintains the brightness uniformity while suppressing power consumption as disclosed in Patent Document 1 described below.

The backlight unit disclosed in Patent Document 1 has a configuration in which a diffuser plate is arranged on a light exit side of a plurality of light sources, and a dimming dot pattern having a total light transmittance (aperture ratio) of 62 to 71% and a haze of 90 to 99% is printed on the diffuser plate. Particularly, in the configuration, the dot diameter immediately above the light sources is large and the dot diameter decreases with distance from the light sources. According to this configuration, the light emitted from the light sources is efficiently utilized, thereby obtaining a sufficient brightness value without increasing the power consumption of the light sources and enabling irradiation of light having uniform brightness.

Patent Document 1: Japanese Unexamined Patent Publication No. 2005-117023

Problem to be Solved by the Invention

To achieve further suppression of the power consumption and a further reduction in cost of the device disclosed in Patent Document 1, it is desirable to reduce the number of light sources to be arranged. In this configuration, however, a local dark place may be formed in the dimming dot pattern as employed in Patent Document 1. Specifically, to suppress formation of the local dark place, it is necessary to more accurately perform setting of the reflectance of the diffuser plate and layout of the dimming dot pattern according to the arrangement of the light sources. Moreover, it is necessary to form the reflection sheet that reflects the light onto the diffuser plate within the chassis so as to be adaptable to the arrangement of the light sources.

DISCLOSURE OF THE PRESENT INVENTION

The present invention was made in view of the foregoing circumstances, and has an object to suppress uneven brightness.

Means for Solving the Problem

A lighting device according to the present invention includes: a light source; a chassis including a bottom plate arranged on a side opposite from a light exit side with respect to the light source and housing the light source; an optical member arranged on the light exit side with respect to the light source; and a reflection sheet arranged within the chassis and including a rising portion rising from a bottom plate side toward the optical member, the reflection sheet being configured to reflect light. The rising portion has a rising proximal end position and a rising end position. The chassis includes a portion facing the optical member and the portion is defined in a light source arrangement area in which the light source is arranged and a light source non-arrangement area in which no light source is arranged. The optical member has a light source arrangement area overlapping portion overlapping with the light source arrangement area and a non-arrangement area overlapping portion overlapping with the light source non-arrangement area. At least a surface of the light source arrangement area overlapping portion that faces the light source has a light reflectance higher than at least a surface of the non-arrangement area overlapping portion that faces the light source. Suppose that a maximum value and a minimum value of the light reflectance on at least a surface of the optical member facing the light source are defined as Rmax and Rmin, respectively, the rising proximal end position overlaps with an area of the optical member having light reflectance R that satisfies Expression (1) given below, and the rising distal end position is provided not to overlap with the area of the optical member having the light reflectance R that satisfies Expression (1) given below.

$$(Rmax-Rmin)/2+Rmin<R \quad (1)$$

With this configuration, the light emitted from the light source reaches a portion having a relatively high light reflectance in the optical member, and thus most part of the light is reflected (that is, not transmitted), thereby suppressing the brightness of illumination light with respect to the light emission amount from the light source. On the other hand, the reflected light in this case can be reflected by the reflection sheet within the chassis and can reach the light source non-arrangement area. A portion overlapping with the light source non-arrangement area in the optical member has a relatively small light reflectance. Therefore, a larger part of the light is transmitted, thereby obtaining a predetermined brightness of illumination light.

The light reflectance of the optical member is set in the manner as described above, and accordingly a certain level of uniformity of light quantity within the chassis can be achieved. However, it is still difficult to achieve the complete uniformity, and the light quantity in the light source non-arrangement area tends to be smaller than that in the light source arrangement area. For this reason, the quantity of light to be supplied to the optical member tends to be relatively smaller in an area of the optical member having light reflectance that does not satisfy Expression (1) mentioned above than in an area having the light reflectance R that satisfies Expression (1).

On the contrary, if the reflection sheet reflecting light within the chassis includes a rising portion rising from the bottom plate side toward the optical member in the chassis, an interval held between the optical member and this rising portion is narrowed and the length of an optical path leading to the optical member is shortened. This efficiently guides the light to the optical member. That is, the rising portion can compensate for the quantity of light to be supplied to the optical member.

In this case, if the rising proximal end position and the rising distal end position of the rising portion are arranged not to overlap with the area having the light reflectance R that satisfies the Expression (1), the rising portion is not present at the boundary position between the area having the light reflectance R that satisfies Expression (1) mentioned above and the area having the light reflectance that does not satisfy the Expression (1). This leads to a possibility that the quantity of light to be supplied to the optical member is locally decreased in the vicinity of the above-mentioned boundary position and a local dark portion may be generated.

In view of the above, the present invention provides a configuration in which the rising proximal end position of the rising portion is arranged to overlap with the area of the optical member having the light reflectance R that satisfies Expression (1) mentioned above, and the rising distal end position of the rising portion is provided not to overlap with the area of the optical member having the light reflectance R that satisfies Expression (1) mentioned above; and the rising portion is arranged over the boundary position between the area having the light reflectance R that satisfies Expression (1) mentioned above and the area having the light reflectance that does not satisfy Expression (1) mentioned above. Accordingly, also in the vicinity of the above-mentioned boundary position, the rising portion enables the light to be efficiently guided to the optical member, thereby avoiding the situation where the quantity of light to be supplied to the optical member is locally decreased. Therefore, there occurs little difference in the quantity of light output in the area of the optical member having the light reflectance R that satisfies Expression (1) mentioned above and light output in the area of the optical member having the light reflectance that does not satisfy Expression (1) mentioned above.

BRIEF DESCRIPTION OF THE DRAWINGS

FIG. 1 is an exploded perspective view showing a schematic configuration of a television receiver according to a first embodiment of the present invention;

BEST MODE FOR CARRYING OUT THE INVENTION

First Embodiment

A first embodiment of the present invention will be described with reference to FIGS. 1 to 10. First, a configuration of a television receiver TV including a liquid crystal display device 10 will be described.

Figure 2:
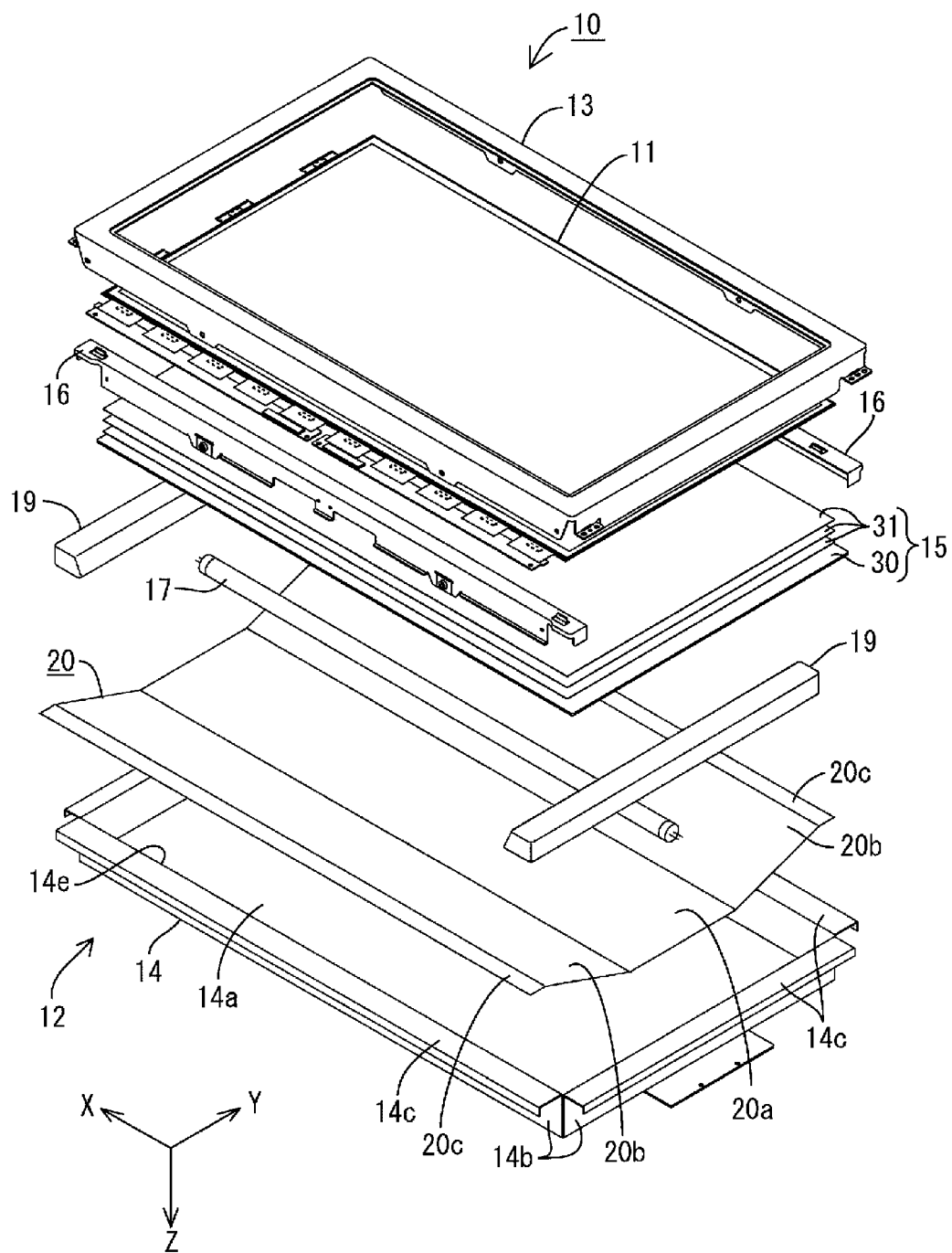
FIG. 2 is an exploded perspective view showing a schematic configuration of a liquid crystal display device included in a television receiver.
Figure 3:
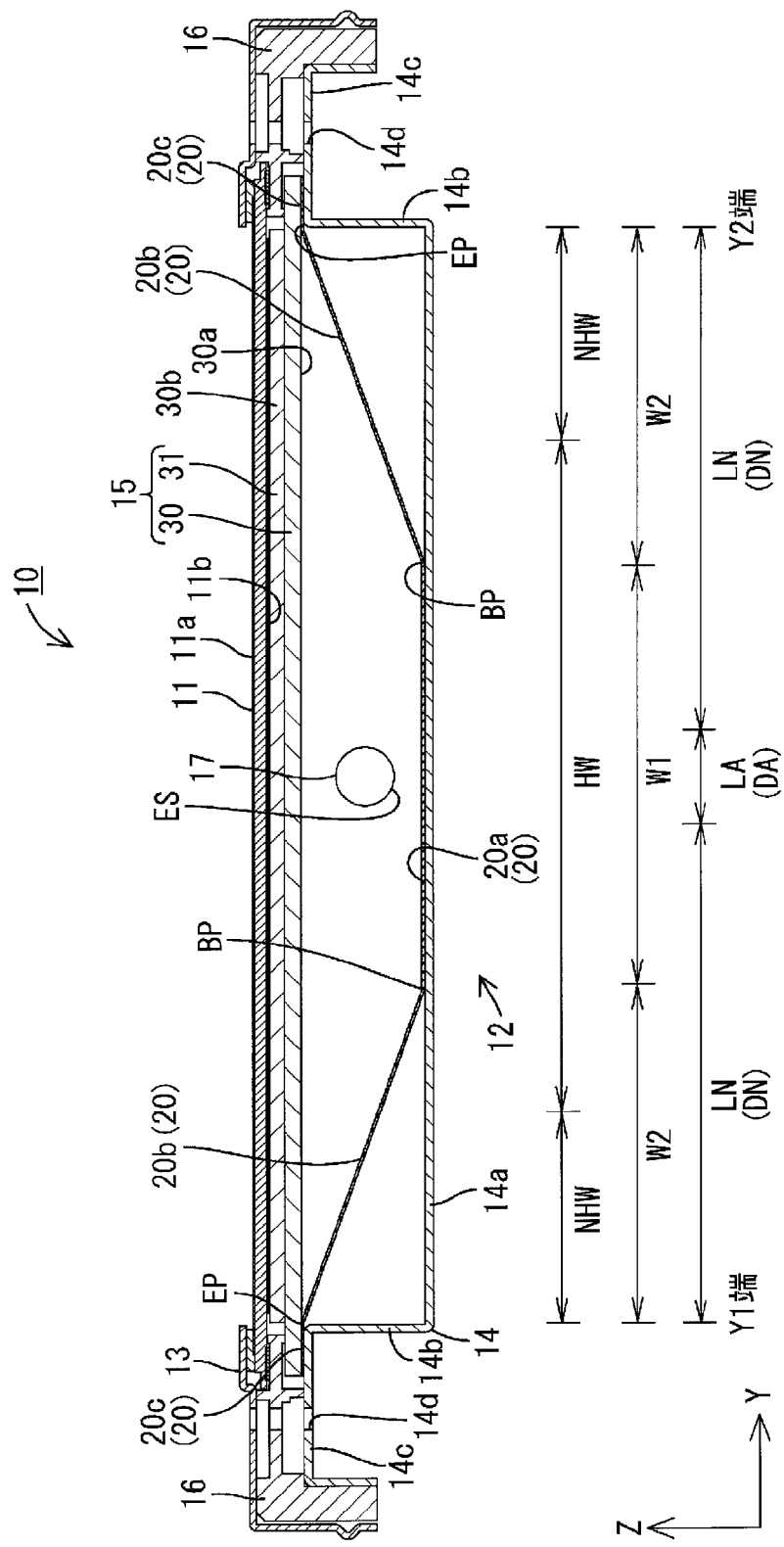
FIG. 3 is a sectional view showing a sectional configuration along the short-side direction of the liquid crystal display device.
Figure 4:
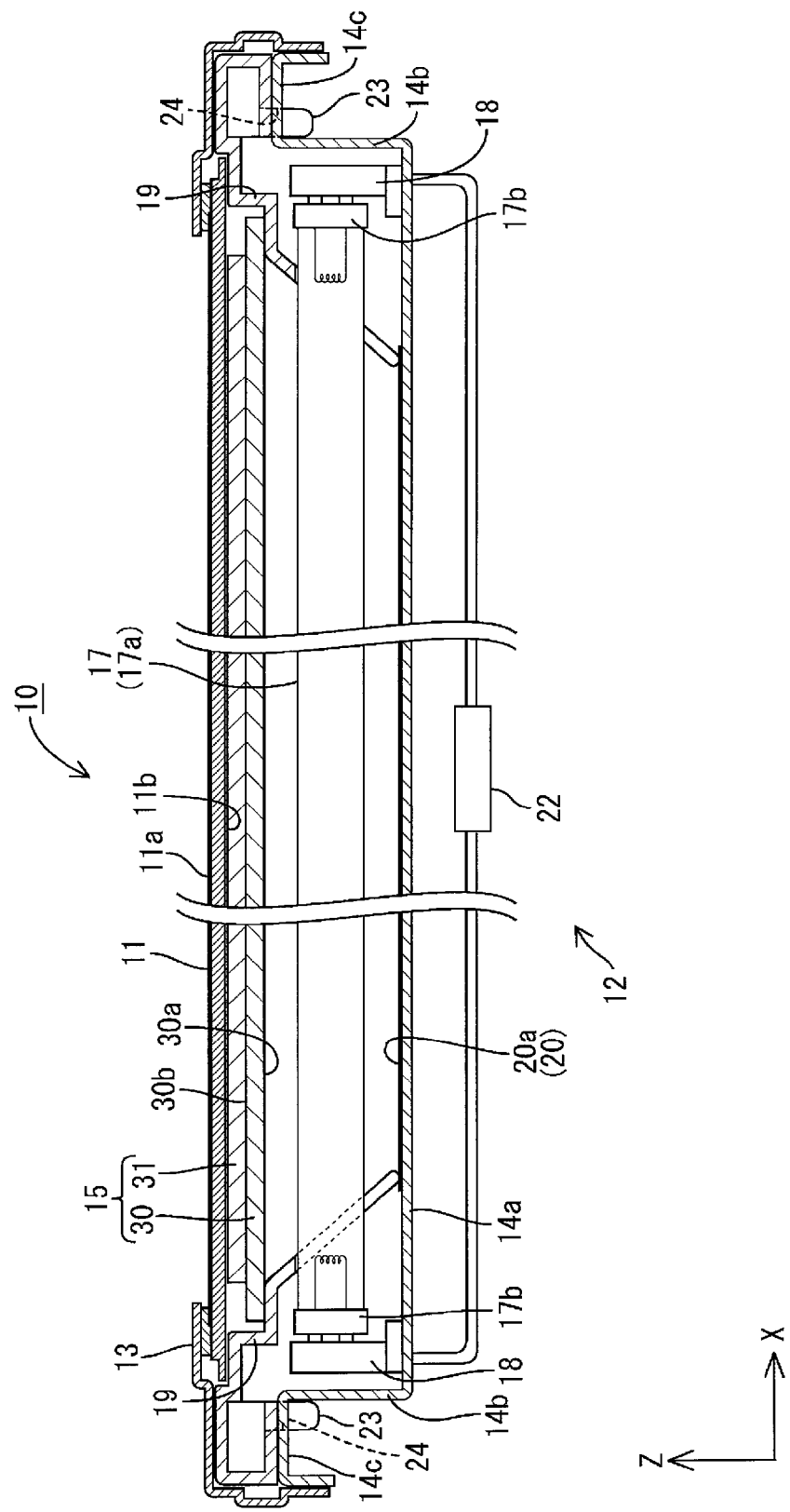
FIG. 4 is a sectional view showing a sectional configuration along the long-side direction of the liquid crystal display device.
Figure 5:
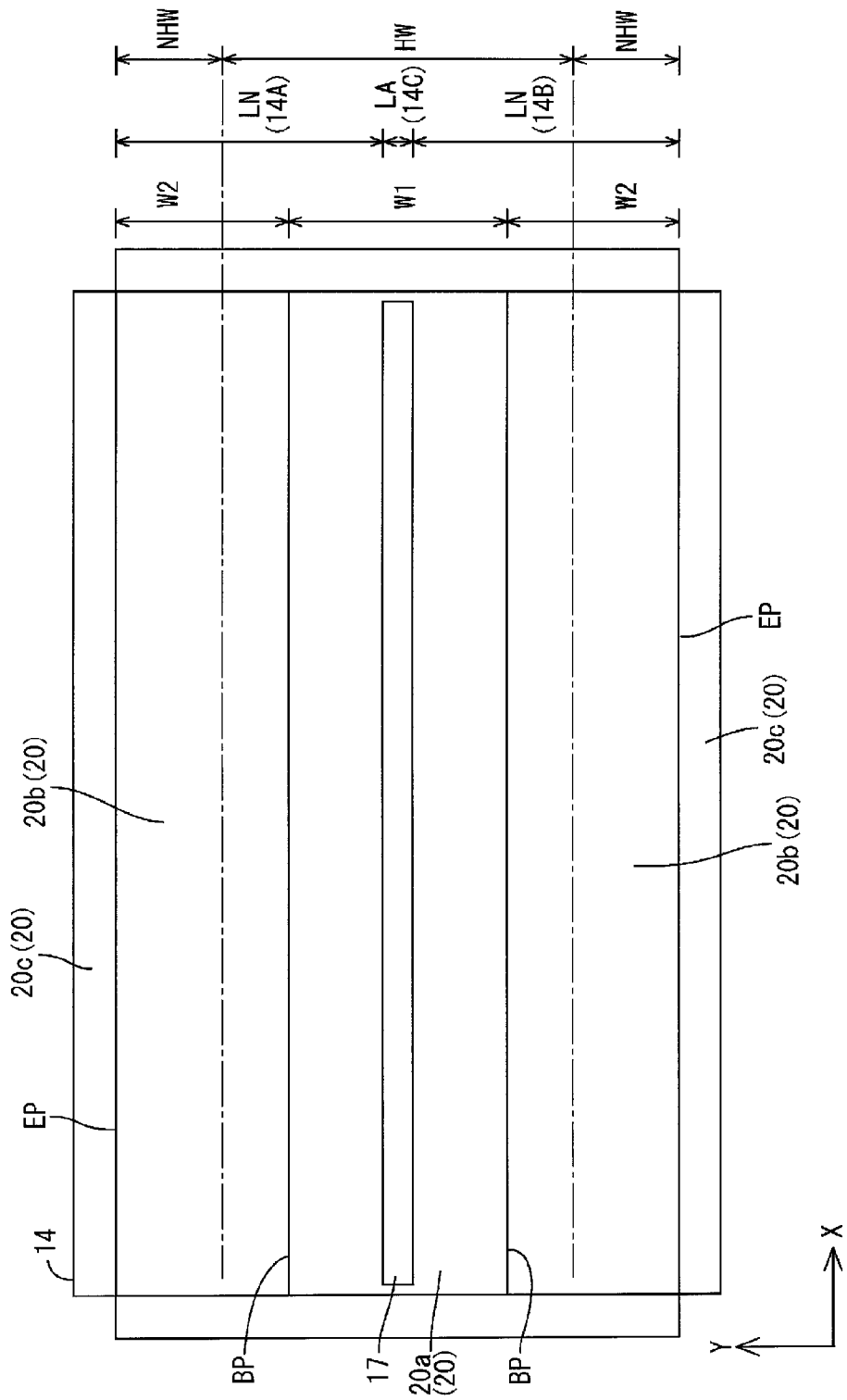
FIG. 5 is a plan view showing an arrangement configuration of a hot-cathode tube and a reflection sheet in a chassis included in the liquid crystal display device.

FIG. 1 is an exploded perspective view showing a schematic configuration of the television receiver of this embodiment. FIG. 2 is an exploded perspective view showing a schematic configuration of the liquid crystal display device included in the television receiver shown in FIG. 1. FIG. 3 is a sectional view showing a sectional configuration taken along the short-side direction of the liquid crystal display device shown in FIG. 2. FIG. 4 is a sectional view showing a sectional configuration taken along the long-side direction of the liquid crystal display device shown in FIG. 2. FIG. 5 is a plan view showing an arrangement configuration of a hot cathode tube and a reflection sheet in a chassis included in the liquid crystal display device shown in FIG. 2. Note that in FIG. 5, the long-side direction of the chassis is referred to as an X-axis direction and the short-side direction thereof is referred to as a Y-axis direction.

As shown in FIG. 1, the television receiver TV according to this embodiment includes a liquid crystal display device 10, front and back cabinets Ca and Cb sandwiching the liquid crystal display device 10 to be housed, a power source P, a tuner T, and a stand S. The liquid crystal display device (display device) 10 is formed in a long square as a whole (rectangular shape, longitudinal shape), and is housed in a longitudinally mounted state. As shown in FIG. 2, this liquid crystal display device 10 includes a liquid crystal panel 11 serving as a display panel, and a backlight unit (lighting device) 12 serving as an external light source, which are integrally held by a frame-shaped bezel 13 or the like. This embodiment illustrates a configuration in which the screen size is 32 inches and the aspect ratio is 16:9. More specifically, the screen has a horizontal dimension (the dimension in the X-axis direction) of about 698 mm and a longitudinal dimension (the dimension in the Y-axis direction) of about 392 mm, for example.

Next, the liquid crystal panel 11 and the backlight unit 12, each of which constitutes the liquid crystal display device 10, will be described (see FIGS. 2 to 4).

The liquid crystal panel (display panel) 11 has a configuration in which a pair of glass substrates is bonded together with a predetermined gap therebetween and a liquid crystal is enclosed between both the glass substrates. One of the glass substrates is provided with switching components (for example, TFTs) connected to each of source wirings and gate wirings that are normal to each other, pixel electrodes respectively connected to the switching component, an alignment film, and the like. The other glass substrate is provided with a color filter in which coloring portions of R (red), G (green), B (blue), and the like are arranged in a predetermined array, counter electrodes, an alignment film, and the like. Note that polarizing plates 11a and 11b are arranged outside both the substrates (see FIGS. 3 and 4).

As shown in FIG. 2, the backlight unit 12 includes a substantially box-shaped chassis 14 having an opening 14e on the front side (the light exit side or the liquid crystal panel 11 side); an optical member 15 group (a diffuser plate (light diffusion member) 30 and a plurality of optical sheets 31 arranged between the diffuser plate 30 and the liquid crystal panel 11) arranged so as to cover the opening 14e of the chassis 14, and a frame 16 which is arranged along the long side of the chassis 14 and sandwiches the long-side edge portion of the optical member 15 group with the chassis 14 to thereby retain the long-side edge portion. Further, the chassis 14 includes a hot cathode tube 17 serving as a light source (linear light source), sockets 18 that relay an electrical connection between end portions of the hot cathode tube 17, and a holder 19 that collectively covers the end portions of the hot cathode tube 17 and the sockets 18. In addition, a reflection sheet 20 that reflects light is laid in the chassis 14. Note that in the backlight unit 12, the side closer to the optical member 15 rather than the hot cathode tube 17 is referred to as the light exit side.

The chassis 14 is made of synthetic resin, and includes, as shown in FIGS. 3 and 4, a bottom plate 14a, side plates 14b rising from end portions on each side of the bottom plate 14a to the front side, and support plates 14c overhanging outwardly from the rising end of each side plate 14b, and forms a shallow, substantially box shape as a whole. The bottom plate 14a has a rectangular shape (elongated shape) in which the long-side direction and the short-side direction of the liquid crystal panel 11 are set to coincide with those of the optical member 15, and has a formation range in which the size in plan view of the liquid crystal panel 11 is substantially the same as that of the optical member 15. Further, at both ends in the long-side direction of the bottom plate 14a, an insertion hole for inserting the sockets 18 is formed. A pair of the side plates 14b is provided at both ends on the long side of the bottom plate 14a and a pair of the side plates 14b is also provided at both ends on the short side thereof. The rising angle from the bottom plate 14a is a substantially right angle. The support plates 14c are formed on the side plates 14b and the angle of bend with respect to each side plate 14b is a substantially right angle. The support plates 14c are in parallel with the bottom plate 14a. The reflection sheet 20 and the outer end portion of the optical member 15 are placed on the support plates 14c, and can receive them from the back side. As shown in FIG. 3, the support plates 14c each have a fixing hole 14d formed therein. The bezel 13, the frame 16, the chassis 14, and the like can be integrated by a screw or the like.

The reflection sheet 20 is made of synthetic resin (for example, made of PET foam), and has a white front surface which is excellent in light reflectivity. As shown in FIG. 2, the reflection sheet 20 is arranged on the inner surface side (on the side opposite to the hot cathode tube 17) in the chassis 14 and covers substantially the entire area. This reflection sheet 20 enables reflection of the light emitted from the hot cathode tube 17 to the optical member 15 side. The reflection sheet 20 has a rectangular shape (elongated shape) in which the chassis 14 coincides with the long-side direction and the short-side direction as a whole, and has a symmetrical shape with respect to the short-side direction. The reflection sheet 20 includes a bottom portion 20a provided along the bottom plate 14a in the chassis 14; a pair of rising portions 20b rising from end portions of the bottom portion 20a to the front side (the light exit side, the side of the optical member 15); and a pair of extending portions 20c extending outward from rising distal portions (end portions opposite from the bottom portion 20a) of the rising portions 20b. As shown in FIGS. 3 and 5, the bottom portion 20a and the pair of rising portions 20b of the reflection sheet 20 have substantially the same size in plan view as the bottom plate 14a of the chassis 14, and is arranged to overlap with the bottom plate 14a in plan view. In other words, the bottom plate 14a of the chassis 14 is formed in the entire range of the bottom portion 20a and the pair of rising portions 20b of the reflection sheet 20 in plan view. Accordingly, the formation range of the bottom plate 14a is wider than that of the case where the bottom plate of the chassis is formed in the range overlapping only with the bottom portion 20a. By using the bottom plate 14a having a sufficiently wide formation range, components such as an inverter board 22 can be mounted on the back surface side, or a hanging attachment (not shown) or the like for hanging the liquid crystal display device 10 can be mounted.

Specifically, the bottom portion 20a is arranged on the center side in the short-side direction (at the position overlapping with a central portion 14C) in the bottom plate 14a of the chassis 14 in plan view, and is in parallel with the plate surface of the bottom plate 14a. The bottom portion 20a has a rectangular shape (elongated shape). The long-side direction of the bottom portion 20a coincides with the X-axis direction (the long-side direction of the chassis 14, or the axis direction of the hot cathode tube 17), and the short-side direction thereof coincides with the Y-axis direction (the short-side direction of the chassis 14). The long-side dimension of the bottom portion 20a is substantially the same as the long-side dimension of the bottom plate 14a of the chassis 14. Meanwhile, the short-side dimension of the bottom portion 20a is smaller than the short-side dimension of the bottom plate 14a. That is, the bottom portion 20a is formed to be smaller than the bottom plate 14a of the chassis 14 only in the short-side direction.

A pair of the rising portions 20b is arranged at positions sandwiching the bottom portion 20a in the short-side direction thereof, and are arranged on both end sides (positions overlapping the both end portions 14A and 14B) in the short-side direction of the bottom plate 14a of the chassis 14 in plan view. That is, each of the rising portions 20b rises in opposite directions from each of the ends on the long side of the bottom portion 20a. The rising portions 20b have a sloped shape with a constant slope from rising proximal portions (an end portion on the side of the bottom portion 20a) to rising distal portions (end portions on the side opposite from the side of the bottom portion 20a (the side of the extending portion 20c)). The plate surfaces of the rising portions 20b are inclined with respect to both the Y-axis direction and the Z-axis direction, that is, the plate surface of the bottom portion 20a. Accordingly, the interval held between the rising portions 20b and the diffuser plate 30 opposed thereto is set to decrease in the direction away from the hot cathode tube 17 (in the direction approaching a screen end side from a screen center side) with respect to the Y-axis direction. A rising angle θ1 at each rising portion 20b from the bottom portion 20a (an inclination angle formed with respect to the plate surface of the bottom portion 20a) is preferably an acute angle (an angle equal to or less than 90 degrees), and more preferably, an angle equal to or less than 45 degrees. Specifically, the angle is 20 degrees to 30 degrees, for example.

The bottom portion 20a of the reflection sheet 20 extends along the inner surface of the bottom plate 14a of the chassis 14 and holds only a small gap. Meanwhile, the rising portions 20b are formed to rise while being spaced apart from the bottom plate 14a, and thus, a gap is held between the bottom plate 14a and the rising portions 20b. The above-mentioned gap gradually increases from the rising proximal portion side to the rising distal portion side. That is, the rising portions 20b are in a floating state on the front side with the gap formed with the bottom plate 14a. This gap has a substantially triangular shape in side view (FIG. 3). Each rising portion 20b has a rectangular shape (longitudinal shape) in plan view, and the long-side direction and the short-side direction thereof are equal to those of the bottom portion 20a. The long-side dimension of each rising portion 20b is substantially the same as the long-side dimension of the bottom plate 14a of the chassis 14, while the short-side dimension of each rising portion 20b is smaller than the short-side dimension of the bottom plate 14a. That is, both the rising portions 20b are formed to be smaller than the bottom plate 14a of the chassis 14 only in the short-side direction. The area of each rising portion 20b (a lengthwise dimension in the Y-axis direction) is set to be greater than the area of the bottom portion 20a (a lengthwise dimension in the Y-axis direction).

Each extending portion 20c extends outwardly from the rising distal end portion of each rising portion 20b, and is arranged to overlap with each support plate 14c of the chassis 14 in plan view. Each extending portion 20c is formed to be in parallel with the plate surface of each of the bottom portions 20a (the bottom plate 14a and each support plate 14c) and is placed on the front side of each support plate 14c. Each extending portion 20c is held between each support plate 14c and the outer edge portion of the diffuser plate 30.

As shown in FIG. 2, the optical member 15 has a long square shape (rectangular shape) in plan view, like the liquid crystal panel 11 and the chassis 14. The optical member 15 is interposed between the liquid crystal panel 11 and the hot cathode tube 17, and includes a diffuser plate 30 arranged on the back side (on the hot cathode tube 17 side, on the side opposite to the light exit side), and an optical sheet 31 arranged on the front side (on the liquid crystal panel 11 side, on the light exit side). The diffuser plate 30 has a configuration in which a number of dispersion particles are scattered in a base substrate made of resin which has a predetermined thickness and is substantially transparent. The diffuser plate 30 has a function of diffusing transmitted light, and specifically, also has a light reflecting function of reflecting light emitted from the hot cathode tube 17 as described later. The optical sheet 31 has a sheet shape having a smaller thickness than the diffuser plate 30, and is formed by stacking three sheets. Specifically, the optical sheet 31 includes a diffuser sheet, a lens sheet, and a reflection type polarizing sheet which are formed in the order from the diffuser plate 30 side (from the back side).

As shown in FIGS. 3 and 4, the hot cathode tube 17 forms a tubular (linear) shape as a whole, and includes a hollow glass tube 17a and a pair of electrodes 17b arranged at both ends of the glass tube 17a. Mercury, rare gas, and the like are enclosed in the glass tube 17a, and a fluorescent material is applied onto the inner wall surface thereof. A light emitting surface ES of the hot cathode tube 17 corresponds to the outer circumferential surface of the glass tube 17a and is configured to emit light radially from the shaft center. Each electrode 17b includes a filament and a pair of terminals respectively connected to both ends of the filament. At both ends of the hot cathode tube 17, the sockets 18 are externally fit, and the terminals are connected to the inverter board 22, which is mounted on the outer surface side (the back surface side) of the bottom plate 14a of the chassis 14, through the sockets 18. The hot cathode tube 17 is supplied with a driving power from the inverter board 22, and the inverter board 22 can control the tube current value, that is, the brightness (lighting state). The hot cathode tube 17 is interposed between the diffuser plate 30 and the bottom plate 14a (reflection sheet 20) of the chassis 14, and is arranged at a position closer to the bottom plate 14a of the chassis 14 than the diffuser plate 30. Note that, the outer diameter dimension of the hot cathode tube 17 is greater than the outer diameter dimension (for example, about 4 mm) of the cold cathode tube, and is set to about 15.5 mm, for example.

As shown in FIG. 5, a single hot cathode tube 17 having the configuration as described above is housed in the chassis 14 in the state where the lengthwise direction (axis direction) thereof coincides with the long-side direction of the chassis 14. The position is at a substantially center in the short-side direction of the chassis 14. Specifically, when the bottom plate 14a (a portion opposite to each of the optical member 15 and the hot cathode tube 17) of the chassis 14 is partitioned into the first end portion 14A in the short-side direction (Y-axis direction), the second end portion 14B positioned at an end portion on the side opposite to the first end portion 14A, and the central portion 14C sandwiched therebetween, the hot cathode tube 17 is arranged in the central portion 14C, and a light source arrangement area LA is formed therein. Meanwhile, the hot cathode tube 17 is not arranged in each of the first end portion 14A and the second end portion 14B of the bottom plate 14a, and a light source non-arrangement area LN is formed therein. Specifically, the hot cathode tube 17 is eccentrically located in the central portion 14C in the short-side direction of the bottom plate 14a of the chassis 14 to thereby form the light source arrangement area LA. The area (the length dimension in the Y-axis direction) of the light source arrangement area LA is smaller than the area (the length dimension in the Y-axis direction) of the light source non-arrangement area LN. Further, the ratio of the area of the light source arrangement area LA (the length dimension in the Y-axis direction) to the entire screen area (the longitudinal dimension (short-side dimension) of the screen) is about 4%, for example. A pair of light source non-arrangement areas LN has substantially the same area.

In the central portion 14C (the light source arrangement area LA) of the chassis 14, a part (specifically, a central portion in the short-side direction) of the bottom portion 20a of the reflection sheet 20 overlaps in plan view. Meanwhile, in the first end portion 14A and the second end portion 14B (light source non-arrangement area LN), a part (specifically, both ends in the short-side direction) of the bottom portion 20a of the reflection sheet 20 and the each rising portion 20b overlap in plan view. That is, in the light source arrangement area LA, the principal part of the bottom portion 20a is arranged, while in the light source non-arrangement area LN, a part of both the end sides of the bottom portion 20a and the entire area of both the rising portions 20b are arranged. The hot cathode tube 17 is formed to have a length dimension substantially the same as the horizontal dimension (long-side dimension) of the screen.

The end portion of the hot cathode tube 17 and the holder 19 covering the socket 18 are made of synthetic resin in white color, and has an elongated, substantially box shape extending along the short-side direction of the chassis 14 as shown in FIG. 2. As shown in FIG. 4, the holder 19 has a step-like surface on which the optical member 15 or the liquid crystal panel 11 can be placed at different levels on the front surface side, and is arranged to partially overlap with each support plate 14c in the short-side direction of the chassis 14, thereby forming a side wall of the backlight unit 12 together with each support plate 14c. A insertion pin 23 projects from the surface of the holder 19 which is opposite to each support plate 14c of the chassis 14, and the insertion pin 23 is inserted into an insertion hole 24, which is formed in the upper surface of each support plate 14c of the chassis 14, thereby mounting the holder 19 to the chassis 14.

Next, a configuration related to a light reflecting function of the diffuser plate 30 will be described in detail.

Figure 6:
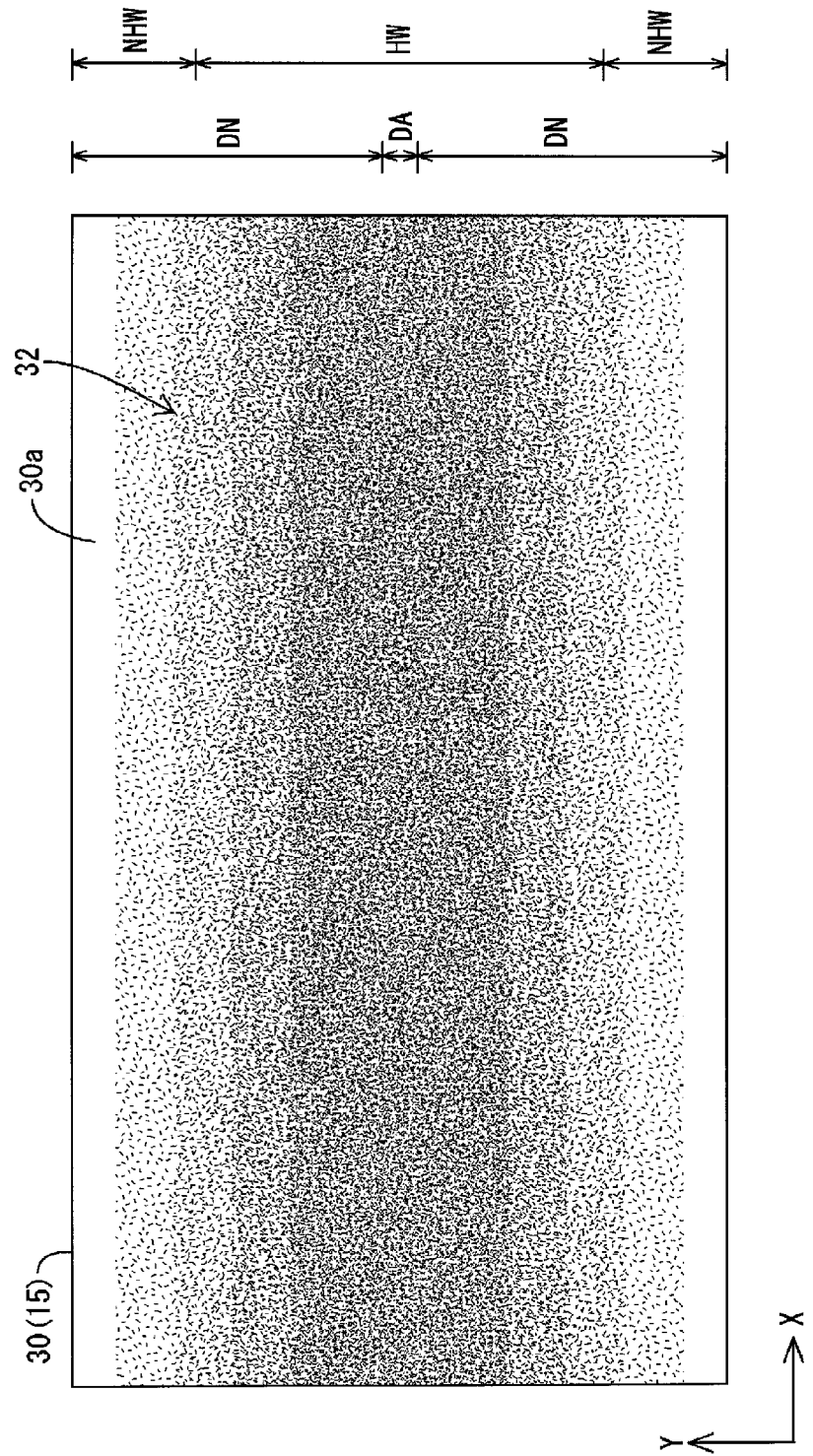
FIG. 6 is a plan view illustrating light reflectance distribution in a diffuser plate.
Figure 7:
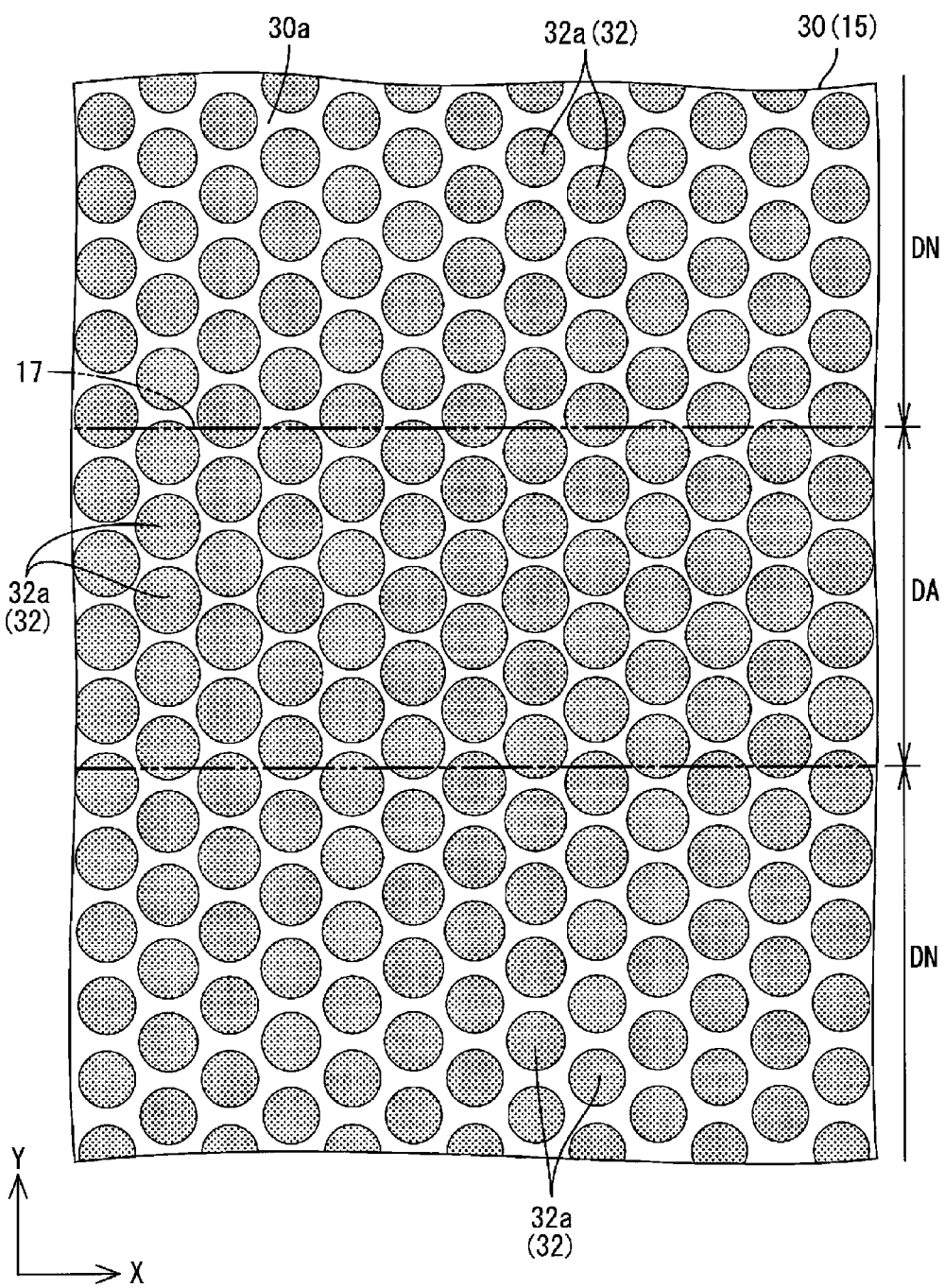
FIG. 7 is an enlarged plan view of a principal part showing a schematic configuration of a surface opposite to a hot cathode tube in the diffuser plate.
Figure 8:
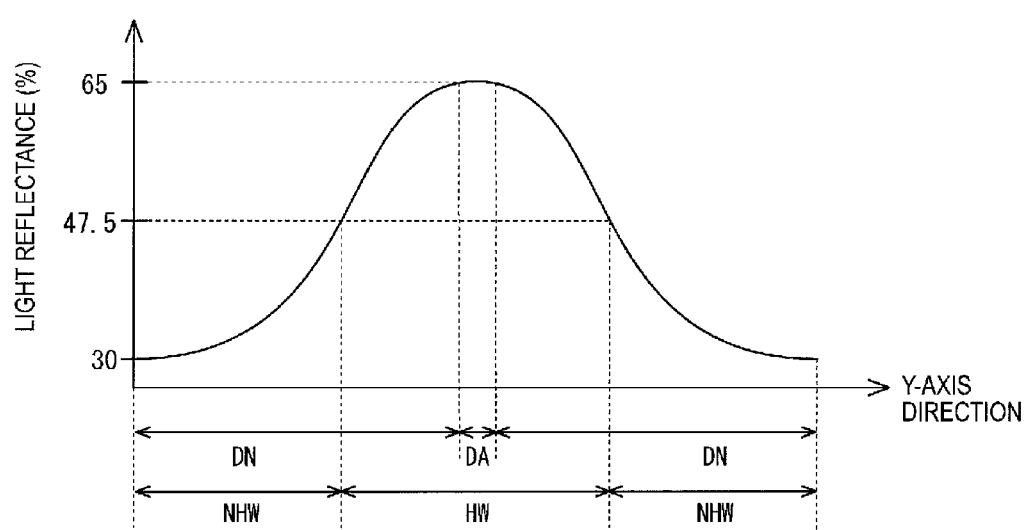
FIG. 8 is a graph showing a change in light reflectance in the short-side direction of the diffuser plate.
Figure 9:
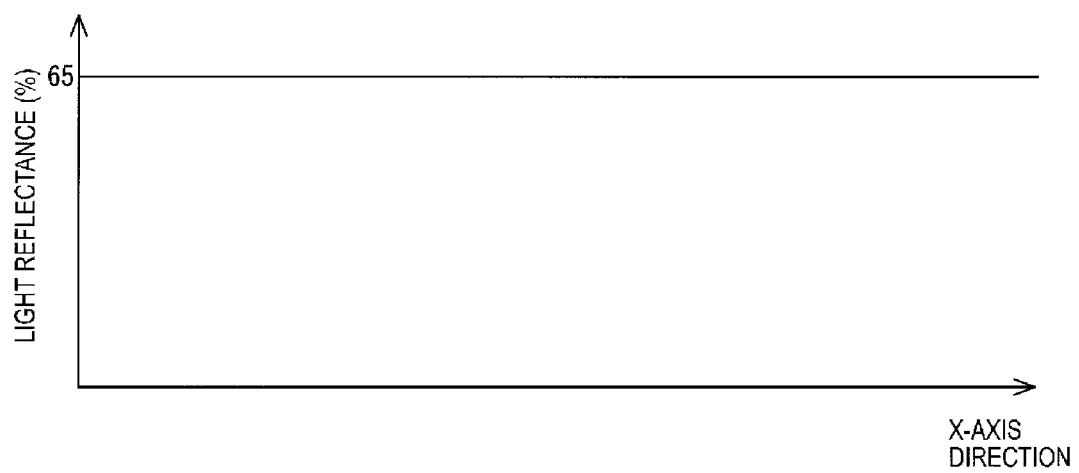
FIG. 9 is a graph showing a change in light reflectance in the long-side direction of the diffuser plate.

FIG. 6 is a plan view illustrating light reflectance distribution in a diffuser plate. FIG. 7 is an enlarged plan view of a principal part showing a schematic configuration of a surface opposite to a hot cathode tube in the diffuser plate shown in FIG. 6. FIG. 8 is a graph showing a change in light reflectance in the short-side direction of the diffuser plate shown in FIG. 6. FIG. 9 is a graph showing a change in light reflectance in the long-side direction of the diffuser plate shown in FIG. 6. In FIGS. 8 and 9, the long-side direction of the diffuser plate is defined as the X-axis direction and the short-side direction thereof is defined as the Y-axis direction. Further, FIG. 8 is a graph in which a horizontal axis shows the Y-axis direction (short-side direction), and the light reflectance from a front-side end portion to a back-side end portion shown in FIG. 6 is plotted on the graph along the Y-axis direction. Similarly, FIG. 9 is a graph in which a horizontal axis shows the X-axis direction (long-side direction), and the light reflectance from a left-side end portion to a right-side end portion shown in FIG. 6 is plotted on the graph along the Y-axis direction.

The diffuser plate 30 is formed such that a predetermined amount of diffusing particles for diffusing light is distributed and blended in a base substrate made of a substantially transparent synthetic resin (for example, made of polystyrene), and the overall light transmittance and light reflectance are substantially uniform. Note that as specific examples of the light transmittance and light reflectance of the base substrate (base substrate excluding light reflecting portions 32 described later) of the diffuser plate 30, it is preferable that the light transmittance be about 70% and the light reflectance be about 30%, for example. The diffuser plate 30 has a surface opposite to the hot cathode tube 17 (hereinafter referred to as "first surface 30a") and a surface which is positioned on the side opposite to the first surface 30a and opposite to the liquid crystal panel 11 (hereinafter referred to as "second surface 30b"). As for these surfaces, the first surface 30a is a light entering surface into which the light from the hot cathode tube 17 side enters, and the second surface 30b is a light emitting surface that outputs the light (illumination light) toward the liquid crystal panel 11.

As shown in FIGS. 6 and 7, the light reflecting portions 32 forming a dot pattern having white color are formed on the first surface 30a forming the light entering surface of the diffuser plate 30. The light reflecting portions 32 are formed by arranging a plurality of dots 32a each having a circular shape in plan view in a zig-zag shape (staggered shape, alternate shape). The dot pattern forming the light reflecting portions 32 is formed by printing a paste containing metal oxide, for example, on the front surface of the diffuser plate 30. As printing means, screen printing, ink jet printing, or the like is suitably used. The light reflectance of each light reflecting portion 32 itself is about 75%, for example, which is greater than the light reflectance within the plane of the diffuser plate 30 itself of about 30%. In this embodiment, the light reflectance of each material is represented by an average light reflectance measured with a LAV of CM-3700d (diameter of measurement circle φ25.4 mm) manufactured by Konica Minolta Co., Ltd. inside the measurement circle. Note that the light reflectance of each light reflecting portion 32 is measured in the following method. The light reflecting portions 32 are formed over the entire surface of a glass substrate and the light reflectance of the formed surface is measured according to the above measurement means.

The diffuser plate 30 has a long-side direction (X-axis direction) and a short-side direction (Y-axis direction). By changing the dot pattern of the light reflecting portions 32, the light reflectance of the first surface 30a of the diffuser plate 30 opposed to the hot cathode tube 17 is changed along the short-side direction as shown in FIG. 8 (see FIG. 6). Specifically, as shown in FIG. 6, the diffuser plate 30 is configured such that the light reflectance of a portion overlapping with the hot cathode tube 17 (hereinafter referred to as "light source overlapping portion DA") is greater than the light reflectance of a portion which is not overlapping with the hot cathode tube 17 (hereinafter referred to as "light source non-overlapping portion DN" in the first surface 30a as a whole. Note that, as shown in FIG. 9, the light reflectance of the first surface 30a of the diffuser plate 30 is hardly changed along the long-side direction and is substantially constant (see FIG. 6).

The light reflectance distribution of the diffuser plate 30 will be described in detail. As shown in FIGS. 6 to 8, the light reflectance of the diffuser plate 30 is set to continuously decrease in the direction away from the hot cathode tube 17 along the short-side direction (Y-axis direction) and to continuously increase in the direction approaching the hot cathode tube 17. The distribution of the light reflectance is set to have a normal distribution (bell-shaped curve). Specifically, the light reflectance of the diffuser plate 30 is maximum at the central position (a position matching the center of the hot cathode tube 17) in the short-side direction, and is minimum at both end positions in the short-side direction. The maximum value of the light reflectance is about 65%, for example, and the minimum value thereof is about 30%, which is equal to the light reflectance of the diffuser plate 30 itself. Accordingly, at both the end positions in the short-side direction of the diffuser plate 30, few or almost no light reflecting portion 32 is arranged. In the diffuser plate 30, an area exceeding a value (for example, about 47.5%) obtained by adding the minimum value of the light reflectance to a half of a value obtained by subtracting the minimum value from a maximum value of the light reflectance is referred to as a half width area HW, and the width dimension of the half width area HW is referred to as a half width. Specifically, assuming that the maximum value of the light reflectance is Rmax and the minimum value thereof is Rmin, an area of the diffuser plate 30 having light reflectance Ra that satisfies Expression (2) given below is defined as the half width area HW.

$$(Rmax-Rmin)/2+Rmin<Ra \quad (2)$$

On the other hand, in the diffuser plate 30, an area not exceeding the value (for example, about 47.5%) obtained by adding the minimum value of the light reflectance to a half of the value obtained by subtracting the minimum value from the maximum value of the light reflectance, that is, an area other than the above-mentioned half width area HW, is referred to as a non-half-width area NHW. Specifically, assuming that the maximum value of the light reflectance is Rmax and the minimum value thereof is Rmin, an area of the diffuser plate 30 having light reflectance Rb that satisfies Expression (3) given below is defined as the non-half-width area NHW. A pair of the non-half-width areas NHW is arranged at positions sandwiching the half width area HW in the diffuser plate 30.

$$(Rmax-Rmin)/2+Rmin>Rb \quad (3)$$

A ratio of the half width to the short-side dimension of the diffuser plate 30 according to this embodiment is, for example, about 60%. That is, the area of about 60% in the middle portion in the short-side direction of the diffuser plate 30 is defined as the half width area HW, and each area of about 20% of the diffuser plate 30 on both end sides in the short-side direction is defined as the non-half-width area NHW. Among these areas, the half width area HW includes the entire light source arrangement area LA (light source overlapping portion DA) and predetermined areas adjacent to the light source arrangement area LA in each light source non-arrangement area LN (each light source non-overlapping portion DN). Specifically, the half width area HW includes more than a half of each light source non-arrangement area LN, and the ratio of the area to the short-side dimension of the diffuser plate 30 is, for example, about 28%. On the other hand, the non-half-width area NHW includes a predetermined area of the area (the area on the side opposite from the side of the light source arrangement area LA) close to the end of the diffuser plate 30 in each light source non-arrangement area LN. Specifically, the non-half-width area NHW includes less than a half of each light source non-arrangement area LN, and the ratio of the area to the short-side dimension of the diffuser plate 30 is about 20%, for example, as described above. The above-mentioned half width area HW can be a high reflectance area having a relatively high light reflectance as compared to the non-half-width area NHW. To put it the other way around, the non-half-width area NHW can be a low reflectance area having a relatively low light reflectance.

Since the light reflectance distribution is set as described above, the light reflecting portions 32 are formed in the following manner. Specifically, among the dots 32a constituting the light reflecting portions 32, a dot coinciding with the central position in the short-side direction of the diffuser plate 30, that is, the central position of the hot cathode tube 17 has a maximum area. The areas of the dots 32a gradually decrease with distance, and a dot located at the outermost side in the short-side direction of the diffuser plate 30 is a minimum area. That is, the area of each dot 32a decreases with distance from the center of the hot cathode tube 17. According to the diffuser plate 30 configured as described above, the brightness distribution of the illumination light in the diffuser plate 30 as a whole can be made smooth. As a result, a smooth illumination brightness distribution can be achieved in the backlight unit 12 as a whole. Note that as means for adjusting the light reflectance, each dot 32a of the light reflecting portion 32 may have the same area, and the interval between the dots 32a may be changed.

In this embodiment, the reflection sheet 20 is arranged in the manner as described below to correspond to the diffuser plate 30 optically designed as described above. Specifically, as shown in FIGS. 3 and 5, the rising portions 20b of the reflection sheet 20 are formed such that rising proximal positions BP from the bottom portion 20a is arranged to overlap with the half width area HW of the diffuser plate 30, and rising distal positions EP are arranged to overlap with the non-half-width area NHW, that is, arranged not to overlap with the half width area HW. In this arrangement, the rising portions 20b are arranged over the boundary position between the half width area HW and the non-half-width area NHW of the diffuser plate 30.

Specifically, the rising proximal positions BP of the rising portions 20b are arranged to overlap with the half width area HW at the positions closer to the hot cathode tube 17 (screen center) than the boundary position between the half width area HW and the non-half-width area NHW of the diffuser plate 30. On the other hand, the rising distal positions EP of the rising portions 20b are arranged to overlap with the non-half-width area NHW at the positions closer to the screen edge (on the side opposite from the side of the hot cathode tube 17) than the boundary position between the half width area HW and the non-half-width area NHW of the diffuser plate 30. Accordingly, the rising portions 20b can be formed in the range over a part of the half width area HW (an end portion on the non-half-width area NHW side) and substantially the entire non-half-width area NHW.

More specifically, a short-side dimension W1 (Y-axis direction dimension) of the bottom portion 20a is set to be smaller than the width dimension (Y-axis direction dimension) of the half width area HW. To be specific, the short-side dimension of the bottom portion 20a is about 60% of the width dimension of the half width area HW and is about 40% of the short-side dimension of the entire chassis 14. On the other hand, a short-side dimension W2 (Y-axis direction dimension) of each rising portion 20b is set to be larger than the width dimension (Y-axis direction dimension) of each non-half-width area NHW. Specifically, the short-side dimension of each rising portion 20b is about 30% of the short-side dimension of the entire chassis 14. Accordingly, the bottom portion 20a is arranged to overlap with the area of about 60% in the middle portion of the half width area HW. Meanwhile, each rising portion 20b is arranged to overlap with the area of about 20% on both ends of the half width area HW and to overlap with the entire non-half-width areas NHW. The rising proximal positions BP of the rising portions 20b are arranged at the positions not overlapping with the hot cathode tube 17 within the half width area HW, that is, in the light source non-arrangement area LN. Accordingly, the bottom portion 20a is arranged over the entire light source arrangement area LA and apart of the both light source non-arrangement areas LN (an end portion closer to the light source arrangement area LA), and the rising portions 20b are arranged to correspond to the remaining portions of each light source non-arrangement area LN. For this reason, the bottom portion 20a is opposed to the light emitting surface ES of the hot cathode tube 17 with respect to the Z-axis direction in the light source arrangement area LA. The bottom portion 20a is formed in parallel with the bottom plate 14a, thereby facilitating fixation of the socket 18, which is required to mount the hot cathode tube 17 to the chassis 14, to the bottom plate 14a. Further, the rising distal positions EP of the rising portions 20b are arranged at the positions overlapping with the end portions in the short-side direction of the diffuser plate 30 within the non-half-width area NHW and are also arranged in the light source non-arrangement area LN.

This embodiment illustrates the configuration as described above, and effects thereof will be described below. When the hot cathode tube 17 is turned on in the case of using the liquid crystal display device 10, the light emitted from the hot cathode tube 17 directly enters the first surface 30a of the diffuser plate 30, or indirectly enters the first surface 30a of the diffuser plate 30 after being reflected by each member (the holder 19, the reflection sheet 20, and the like) provided within the chassis 14. After transmitting through the diffuser plate 30, the light is output to the liquid crystal panel 11 through the optical sheet 31.

First, the light reflection function of the diffuser plate 30 will be described in detail. As shown in FIG. 6, on the first surface 30a of the diffuser plate 30 into which the light emitted from the hot cathode tube 17 enters, light reflecting portions 32 having different light reflectance within the plane for each area are formed, thereby making it possible to appropriately control the incidence efficiency of the light for each area. Specifically, in the light source overlapping portion DA overlapping with the hot cathode tube 17 on the first surface 30a, a large amount of direct light from the hot cathode tube 17 is present, and thus the amount of light is relatively larger than that in the light source non-overlapping portion DN. Accordingly, the light reflectance of the light reflecting portion 32 is set to be relatively large in the light source overlapping portion DA (see FIGS. 6 and 8), thereby making it possible to suppress (regulate) incidence of the light onto the first surface 30a and reflect and return a large amount of light into the chassis 14. Meanwhile, in the light source non-overlapping portion DN which does not overlap with the hot cathode tube 17 on the first surface 30a, the amount of direct light from the hot cathode tube 17 is small, and the amount of light is relatively smaller than that in the light source overlapping portion DA. Accordingly, the light reflectance of the light reflecting portion 32 in the light source non-overlapping portion DN is set to be relatively small (see FIGS. 6 and 8), thereby promoting the incidence of light onto the first surface 30a. At this time, in the light source non-overlapping portion DN, the light reflected within the chassis 14 by the light reflecting portion 32 of the light source overlapping portion DA is guided by the above-described reflection sheet 20 and the like, thereby supplementing the amount of light. Therefore, the amount of light entering the light source non-overlapping portion DN can be sufficiently secured.

As described above, the optical design of the diffuser plate 30 is devised to thereby achieve a certain level of uniformity of the light quantity within the chassis 14. However, it is still difficult to achieve the complete uniformity, and the light quantity within the chassis 14 in the light source arrangement area LA tends to be smaller than that in the light source non-arrangement area LN. Accordingly, the quantity of light to be supplied to the diffuser plate 30 tends to be relatively smaller in the non-half-width area NHW than in the half width area HW in the diffuser plate 30. Thus, in this embodiment, the shape and arrangement of the reflection sheet 20 are devised to thereby achieve the uniformity of the quantity of light to be supplied to the diffuser plate 30.

Next, the light reflection function of the reflection sheet 20 will be described in detail. As shown in FIG. 3, the rising portions 20b of the reflection sheet 20 are formed to rise from the bottom portion 20a to the front side. Accordingly, the interval between the rising portions 20b and the diffuser plate 30, that is, the space in which the light propagates back and forth in the chassis 14, is narrowed in the range from the rising proximal portion side to the rising distal portion side (in the direction away from the hot cathode tube 17), and the length of the optical path leading from the rising portions 20b to the diffuser plate 30 is shortened. The amount of light within the chassis 14 tends to be substantially inversely proportional to the distance from the hot cathode tube 17. The amount of light in the light source non-arrangement area LN tends to be smaller than that in the light source arrangement area LA. For this reason, dark spaces are liable to occur in the light source non-arrangement area LN. In this regard, in this embodiment, the space in which the light propagates back and forth in the light source non-arrangement area LN whose light quantity tends to be small is narrowed by the rising portions 20b, and the length of the optical path leading to the diffuser plate 30 is shortened, thereby making it possible to efficiently guide the light to the diffuser plate 30. Therefore, the quantity of light to be supplied to the diffuser plate 30 in the light source non-arrangement area LN can be sufficiently compensated for, thereby preventing the light source non-arrangement area LN from being viewed as a dark portion.

More specifically, in the rising portions 20b, the rising proximal positions BP from the bottom portion 20a is arranged to overlap with the half width area HW in the diffuser plate 30, and the rising distal positions EP are arranged to overlap with the non-half-width area NHW in the diffuser plate 30. The rising portions 20b are arranged over the half width area HW and the non-half-width area NHW. Accordingly, also at the boundary position between the half width area HW and the non-half-width area NEW, the rising portions 20b enable the light to be efficiently guided to the diffuser plate 30.

In this case, if the rising proximal position and the rising distal position of the rising portion are arranged to overlap with the non-half-width area NHW, the rising portion is not present at the boundary position between the half width area HW and the non-half-width area NHW, but the bottom portion is present at the boundary position. Accordingly, at the above-mentioned boundary position, the length of the optical path leading from the bottom portion to the diffuser plate 30 becomes longer than the length of the optical path leading from the rising portion to the diffuser plate 30, and the quantity of light to be supplied to the diffuser plate 30 is locally decreased. As a result, a portion (dark portion) in which the light quantity is locally decreased due to the presence of the bottom portion in the non-half-width area NEW is interposed between the half width area HW (bright portion) in which the light quantity is originally large, and a portion (bright portion) in which the light quantity is compensated for by the rising portion in the non-half-width area NHW. Thus, the portion is likely to be viewed as a local dark portion.

In this regard, in this embodiment, the bottom portion 20a is not present at the boundary position between the half width area HW and the non-half-width area NHW, the rising portions 20b enable the light to be efficiently guided to the diffuser plate 30, thereby avoiding the situation in which the quantity of light to be supplied to the diffuser plate 30 is locally decreased. Therefore, there occurs little difference in the quantity of light to be supplied and the quantity of light to be output between the half width area HW and the non-half-width area NEW in the diffuser plate 30. Consequently, the uneven brightness in the illumination light hardly occurs.

EXAMPLES

Figure 10:
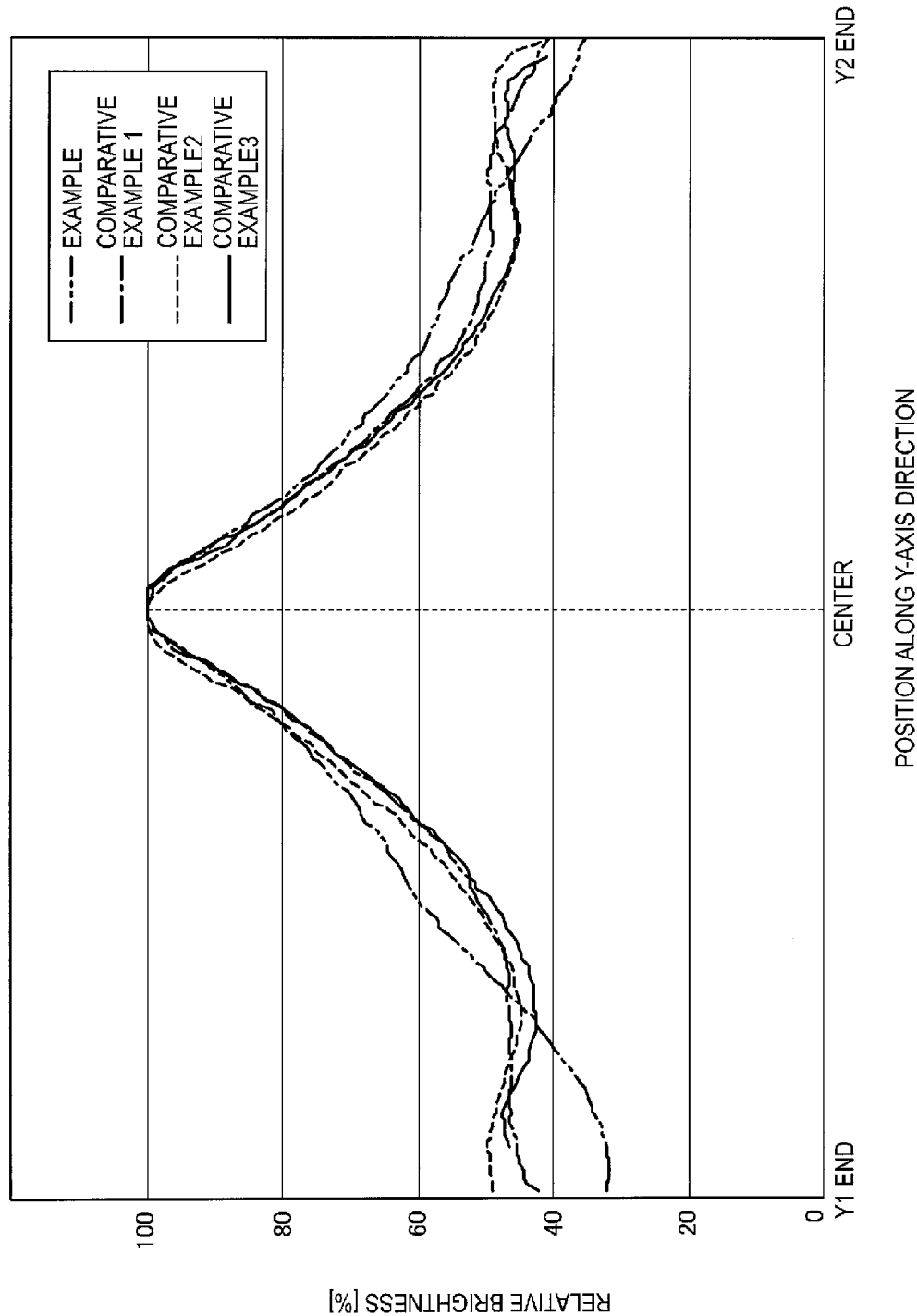
FIG. 10 is a graph showing a brightness distribution in the Y-axis direction of light output from the diffuser plate in the case of using reflection sheets according to an example and comparative examples.

Given below are an example using the reflection sheet 20 according to the embodiments described above and comparative examples using reflection sheets having configurations different from that of the embodiments described above. Results of experiments on the degree of visibility of uneven brightness are shown in Table 1 below and FIG. 10. In the comparative experiments, four types of reflection sheets having different ratios between the short-side dimension of the bottom portion and that of the rising portion were prepared, and each reflection sheet was housed in the chassis. Further, the hot cathode tube turned on in the state where the diffuser plate is arranged at the opening of the chassis was visually observed from the front. In Table 1, "⊚" represents the case where the uneven brightness is not viewed; "○" represents the case where almost no uneven brightness is viewed; "Δ" represents the case where the uneven brightness is slightly viewed; and "X" represents the case where the uneven brightness is viewed. FIG. 10 is a graph showing a brightness distribution in the Y-axis direction of light output from the diffuser plate in the case where the reflection sheets according to the example and each comparative example are used. The vertical axis represents a relative brightness when the maximum brightness is 100%, and the horizontal axis shows positions in the Y-axis direction of the diffuser plate (see FIG. 3).

In the example, the short-side dimension of the bottom portion is smaller than the dimension of the half width area, and the rising angle at each rising portion is set to about 20 degrees. In a first comparative example, the short-side dimension of the bottom portion is slightly larger than the dimension of the half width area, and the rising angle at the rising portion is about 30 degrees. In a second comparative example, the short-side dimension of the bottom portion is larger than the dimension of the half width area, and the rising angle at the rising portion is about 45 degrees. In a third comparative example, the short-side dimension of the bottom portion is considerably larger than the dimension of the half width area, and the rising angle at the rising portion is about 60 degrees.

TABLE 1

| | Short-side dimension of the bottom portion (mm) | Dimension of the half width area (mm) | Evaluation |
|---|---|---|---|
| Example | 152 | 244 | ⊚ |
| Comparative Example 1 | 248 | 244 | Δ |
| Comparative Example 2 | 317 | 244 | X |
| Comparative Example 3 | 354 | 244 | X |

As is obvious from Table 1 and FIG. 10 described above, the use of the reflection sheet 20 according to the example can preferably prevent the uneven brightness. On the contrary, in the first to third comparative examples, the uneven brightness is viewed. This is because in the first to third comparative examples, a part of the bottom portion overlaps with the non-half-width area NHW, and the overlapping portion between the bottom portion and the non-half-width area NHW seems to be easily viewed as a local dark portion, as compared to the other portions (portions overlapping with the rising portion of the half width area HW and the non-half-width area NHW). Further, the uneven brightness tends to be increased in the second and third comparative examples than in the first comparative example. Accordingly, as the overlapping portion between the bottom portion and the non-half-width area NEW is enlarged, the local dark portion is more likely to be viewed and the display quality tends to deteriorate. In contrast, in the example, the bottom portion 20a is not present at the position overlapping with the non-half-width area NEW and only the rising portions 20b are present in the non-half-width area NEW. Accordingly, the rising portions 20b enable the light to be efficiently guided to the entire non-half-width area NEW. Therefore, there occurs little difference in the quantity of the light to be supplied between the half width area HW and the non-half-width area NEW. Consequently, the uneven brightness is hardly viewed.

As described above, the backlight unit 12 according to this embodiment includes the hot cathode tube 17 serving as the light source; the chassis 14 including the bottom plate 14a arranged on the side opposite from the light exit side with respect to the hot cathode tube 17 and housing the hot cathode tube 17; the diffuser plate 30 serving as the optical member arranged on the light exit side with respect to the hot cathode tube 17; and the reflection sheet 20 arranged in the chassis 14 and including the rising portions 20b rising from the bottom plate 14a side toward the diffuser plate 30, the reflection sheet 20 being configured to reflect light. A portion of the chassis 14 opposed to the diffuser plate 30 is partitioned into the light source arrangement area LA in which the hot cathode tube 17 is arranged, and the light source non-arrangement area LN in which the hot cathode tube 17 is not arranged. Meanwhile, in the diffuser plate 30, the light reflectance on at least the first surface 30a facing the hot cathode tube 17 of the portion (light source overlapping portion DA) overlapping with the light source arrangement area LA is set to be larger than the light reflectance on at least the first surface 30a facing the hot cathode tube 17 of the portion (light source non-overlapping portion DN) overlapping with the light source non-arrangement area LN. Assuming that the maximum value of the light reflectance on at least the first surface 30a of the diffuser plate 30 facing the hot cathode tube 17 is Rmax and the minimum value thereof is Rmin, the rising proximal end positions BP of the rising portions 20b in the reflection sheet 20 are arranged to overlap with the area (half width area HW) of the diffuser plate 30 having the light reflectance R that satisfies Expression (4) given below, and the rising distal positions EP of the rising portions 20b are arranged not to overlap with the area (half width area HW) of the diffuser plate 30 having the light reflectance R that satisfies Expression (4) given below.

$$(Rmax-Rmin)/2+Rmin<R \qquad (4)$$

With this configuration, the light emitted from the hot cathode tube 17 first reaches the portion having a relatively large light reflectance in the diffuser plate 30. Accordingly, most part of the light is reflected (that is, the light is not transmitted), and the brightness of the illumination light with respect to the amount of light emitted from the hot cathode tube 17 is suppressed. On the other hand, the light reflected in this case can be reflected by the reflection sheet 20 in the chassis 14 and can reach the light source non-arrangement area LN. The portion overlapping with the light source non-arrangement area LN in the diffuser plate 30 has a relatively small light reflectance. Accordingly, a larger quantity of light is transmitted to thereby obtain a predetermined brightness of illumination light.

Incidentally, a certain level of uniformity in the light quantity within the chassis 14 can be achieved by setting the light reflectance of the diffuser plate 30 in the manner as described above. However, it is still difficult to achieve the complete uniformity, and the light quantity in the light source non-arrangement area LN tends to be smaller than that in the light source arrangement area LA. Accordingly, the quantity of light to be supplied to the diffuser plate 30 is relatively smaller in the area (non-half-width area NEW) of the diffuser plate 30 having the light reflectance that does not satisfy Expression (4) mentioned above than in the area (half width area HW) having the light reflectance R that satisfies Expression (4).

On the contrary, when the reflection sheet 20 that reflects light in the chassis 14 includes the rising portions 20b rising from the bottom plate 14a side in the chassis 14 toward the diffuser plate 30, the interval held between the rising portions 20b and the diffuser plate 30 is narrowed and the length of the optical path leading to the diffuser plate 30 is shortened in the rising portions 20b, thereby making it possible to efficiently guide the light to the diffuser plate 30. That is, the rising portions 20b can compensate for the quantity of light to be supplied to the diffuser plate 30.

In this case, if the rising proximal position and the rising distal position of the rising portion are arranged not to overlap with the area (half width area HW) having the light reflectance R that satisfies Expression (4) mentioned above, the rising portion is not present at the boundary position between the area (half width area HW) having the light reflectance R that satisfies Expression (4) mentioned above and the area (non-half-width area NHW) having the light reflectance that does not satisfy Expression (4) mentioned above. This leads to a possibility that the quantity of light to be supplied to the diffuser plate 30 is locally decreased in the vicinity of the above-mentioned boundary position and a local dark portion is generated.

Accordingly, in this embodiment, the rising proximal positions BP of the rising portions 20b are arranged to overlap with the area (half width area HW) of the diffuser plate 30 having the light reflectance R that satisfies Expression (4) mentioned above, and the rising distal positions EP of the rising portions 20b are arranged not to overlap with the area (half width area HW) of the diffuser plate 30 having the light reflectance R that satisfies Expression (4) mentioned above. Further, the rising portions 20b are arranged over the boundary position between the area (half width area HW) having the light reflectance R that satisfies Expression (4) mentioned above and the area (non-half-width area NHW) having the light reflectance that does not satisfy Expression (4) mentioned above. Accordingly, also at the above-mentioned boundary position, the rising portions 20b enable the light to be efficiently guided to the diffuser plate 30, thereby avoiding the situation in which the quantity of light to be supplied to the diffuser plate 30 is locally decreased. Therefore, there occurs little difference in the quantity of light to be output between the area (half width area HW) of the diffuser plate 30 having the light reflectance R that satisfies Expression (4) mentioned above and the area (non-half-width area NHW) of the diffuser plate 30 having the light reflectance that does not satisfy Expression (4) mentioned above.

The reflection sheet 20 includes the bottom portion 20a which is arranged along the bottom plate 14a and at least a part of which is arranged in the light source arrangement area LA. The rising portions 20b are formed to rise from the bottom portion 20a toward the diffuser plate 30. In the reflection sheet 20, the portion corresponding to the light source arrangement area LA is interposed between the hot cathode tube 17 and the bottom plate 14a of the chassis 14. Accordingly, if the portion has a complicated shape, there is a possibility that the portion inhibits the installation of the hot cathode tube 17, for example. In this regard, according to this embodiment, in the reflection sheet 20, at least apart of the bottom portion 20a arranged along the bottom plate 14a is arranged in the light source arrangement area LA. Thus, the reflection sheet 20 hardly inhibits the installation of the hot cathode tube 17, for example.

The rising proximal positions BP of the rising portions 20b from the bottom portion 20a are arranged in the light source non-arrangement area LN. With this configuration, the bottom portion 20a is arranged over the entire light source arrangement area LA, whereby reliably preventing the reflection sheet 20 from inhibiting the installation of the hot cathode tube 17, for example.

The hot cathode tube 17 has the light emitting surface ES that emits light, and the bottom portion 20a is arranged to be opposed to the light emitting surface ES. With this configuration, the length of the optical path leading from the light emitting surface ES of the hot cathode tube 17 to the reflection sheet 20 in the light source arrangement area LA can be increased, as compared to the case where the rising proximal positions BP of the rising portions 20b are arranged in the light source arrangement area LA. As a result, the light reflected by the reflection sheet 20 in the light source arrangement area LA is hardly returned directly to the hot cathode tube 17, thereby making it possible to maintain a high light use efficiency.

The end portions of the bottom plate 14a are provided with the side plates 14b each rising to the light exit side, and the outwardly overhanging support plates 14c are provided at the rising ends of the side plates 14b, meanwhile, each extending portions 20c extending along each support plate 14c is provided at the rising end of each rising portion 20b. With this configuration, the bottom portion 20a of the reflection sheet 20 is provided along the bottom plate 14a, and each extending portion 20c is provided along each support plate 14c. This makes it possible to further stabilize the shape of each rising portion 20b which is positioned between the bottom portion 20a and each extending portion 20c.

The rising portions 20b are formed such that the interval held between the rising portions 20b and the diffuser plate 30 decreases in the direction away from the hot cathode tube 17. The light quantity within the chassis 14 tends to decrease with distance from the hot cathode tube 17. On the contrary, when the interval held between the rising portions 20b and the diffuser plate 30 is decreased in the direction away from the hot cathode tube 17, the length of the optical path leading from the rising portions 20b to the diffuser plate 30 tends to be in proportion to the light quantity within the chassis 14. As the length of the optical path decreases, the light can be more efficiently guided to the diffuser plate 30. Therefore, the above-mentioned rising portions 20b enable the light to be evenly guided to the diffuser plate 30.

The rising portions 20b have a sloped shape. With this configuration, the rising portions 20b having the sloped shape enable the light to be efficiently reflected onto the diffuser plate 30.

The angle formed by the rising portions 20b with respect to the bottom plate 14a is an acute angle. With this configuration, the light reflected by the rising portions 20b has an angle based on the angle formed with respect to the bottom plate 14a. Setting the angle as an acute angle enables the light to be efficiently guided to the diffuser plate 30.

The portion of the chassis 14 opposed to the diffuser plate 30 is partitioned into at least the first end portion 14A, the second end portion 14B positioned at the end portion on the side opposite from the first end portion 14A, and the central portion 14C sandwiched between the first end portion 14A and the second end portion 14B. Among these portions, the central portion 14C is defined as the light source arrangement area LA, and the first end portion 14A and the second end portion 14B are defined as the light source non-arrangement area LN. With this configuration, sufficient brightness can be secured in the central portion of the backlight unit 12, and the brightness of the display central portion of the liquid crystal display device 10 including the backlight unit 12 can also be secured, thereby obtaining favorable visibility.

A pair of the rising portions 20b is provided to respectively correspond to the first end portion 14A and the second end portion 14B. With this configuration, the rising portions 20b are arranged to respectively correspond to the first end portion 14A and the second end portion 14B serving as the light source non-arrangement areas LN in which the light quantity tends to be small. This makes it possible to efficiently guide the light to the diffuser plate 30.

The diffuser plate 30 is configured such that the light reflectance on the first surface 30a opposite to at least the hot cathode tube 17 side decreases in the direction away from the hot cathode tube 17. With this configuration, the brightness distribution of illumination light output from the diffuser plate 30 can be made smooth in the range from the portion overlapping with the light source arrangement area LA and the portion overlapping with the light source non-arrangement area LN.

The light reflecting portion 32 configured to reflect light is formed on the first surface 30a of the diffuser plate 30 facing the hot cathode tube 17. With this configuration, the light reflectance at the surface of the diffuser plate 30 facing the hot cathode tube 17 can be appropriately controlled according to the aspects of the light reflecting portion 32.

The light reflecting portion has a substantially dot shape within the surface area of the diffuser plate 30 facing the hot cathode tube 17, and is formed of a number of dots 32a each having a light reflectivity. With this configuration, the light reflectance can be easily controlled according to the aspects (area, distribution density, and the like) of the dots 32a.

The chassis 14 has a rectangular shape in plan view. The hot cathode tube 17 is formed to extend along the long-side direction of the chassis 14, and the light source arrangement area LA and the light source non-arrangement area LN are arranged side by side along the short-side direction of the chassis 14. This configuration is suitable for the use of a linear light source, for example, as the light source.

The light source is formed of the hot cathode tube 17. With this configuration, an increase in brightness, for example, can be achieved.

Though the first embodiment of the present invention has been described above, the present invention is not limited to the above embodiment. The present invention can include modified examples as described below, for example. Note that in each of the following modified examples, the same components as those of the above-described embodiment are denoted by the same reference numerals as those of the embodiment, and the illustration and description thereof are not repeated as needed.

First Modified Example of the First Embodiment

Figure 11:
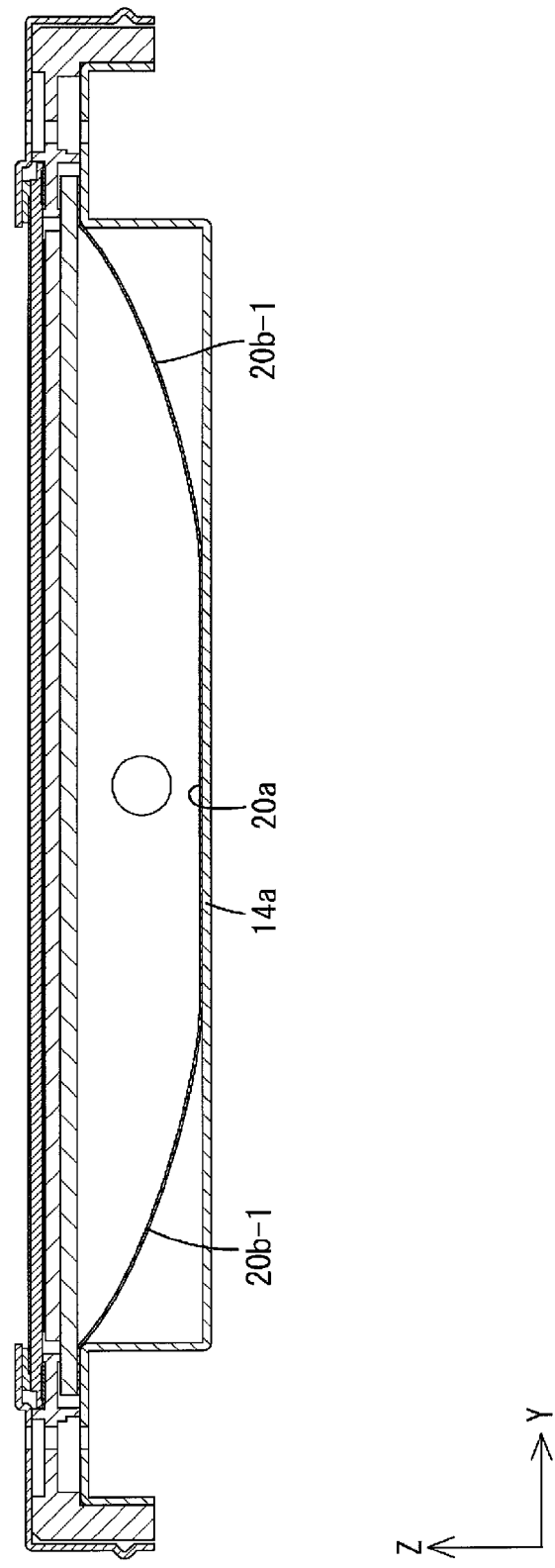
FIG. 11 is a sectional view taken along the short-side direction of the liquid crystal display device using a reflection sheet according to a first modified example of the first embodiment.

A first modified example of the first embodiment will be described with reference to FIG. 11. Here, a configuration in which the shape of rising portions 20b-1 is changed is illustrated. FIG. 11 is a sectional view taken along the short-side direction in a liquid crystal display device using a reflection sheet according to this modified example.

As shown in FIG. 11, the rising portions 20b-1 have a sectional shape of a substantially arcuate shape (bow-like shape) taken along the Y-axis direction. Specifically, the rising portions 20b-1 have a substantially arcuate shape curved to the back side, and the entirety thereof is arranged to recede to the side of the bottom plate 14a from a line (chord) connecting the rising proximal portion and the rising distal portion. A rising angle of each rising portion 20b-1 from the bottom portion 20a is substantially the same as that of the first embodiment described above. This rising angle is an angle formed by the tangential line at the rising proximal end of the rising portions 20b-1 with respect to the bottom portion 20a.

As described above, according to this modified example, the rising portions 20b-1 have an arcuate shape. With this configuration, the rising portions 20b-1 having the arcuate shape enable the light to be efficiently reflected onto the diffuser plate 30.

Second Modified Example of the First Embodiment

Figure 12:
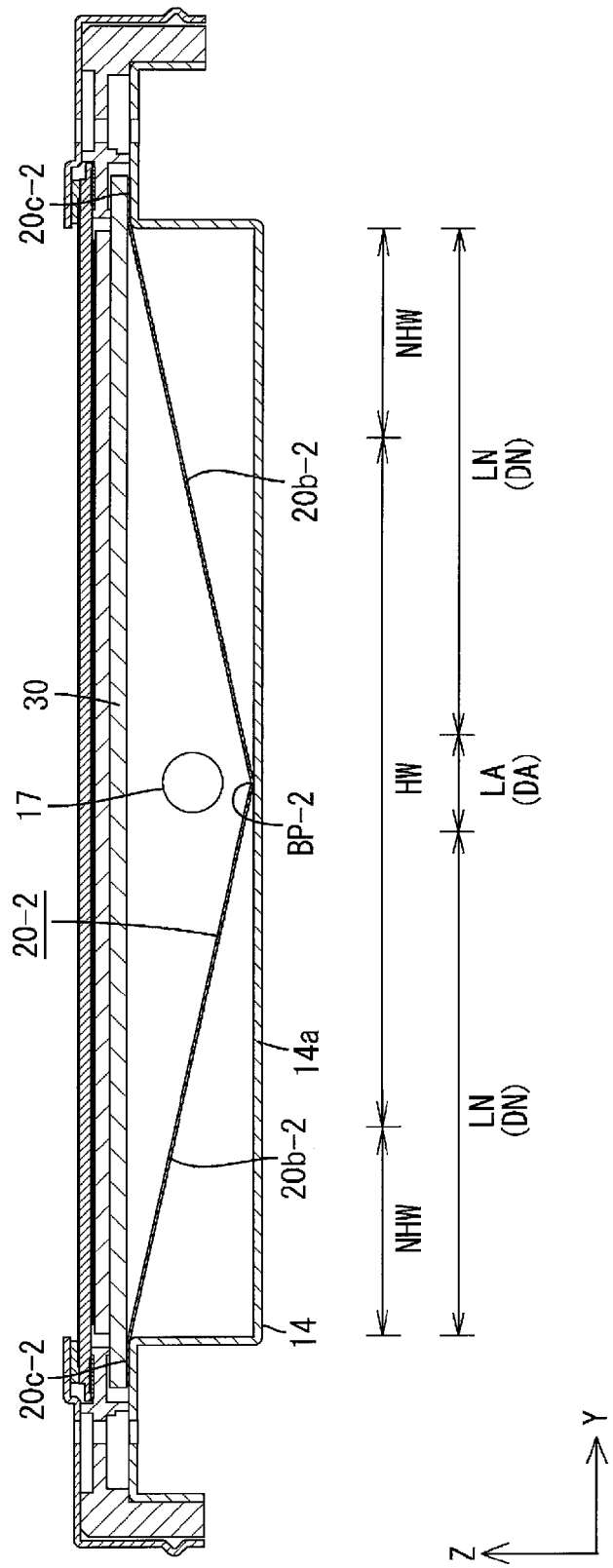
FIG. 12 is a sectional view taken along the short-side direction of the liquid crystal display device using a reflection sheet according to a second modified example of the first embodiment.

A second modified example of the first embodiment will be described with reference to FIG. 12. Herein, a configuration in which the shape of a reflection sheet 20-2 is changed is illustrated. FIG. 12 is a sectional view taken along the short-side direction of the liquid crystal display device using the reflection sheet according to this modified example.

As shown in FIG. 12, in this reflection sheet 20-2, the bottom portion illustrated in the first embodiment described above is omitted. That is, the reflection sheet 20-2 includes a pair of rising portions 20b-2 rising from the bottom plate 14a side in the chassis 14 toward the diffuser plate 30, and a pair of extending portions 20c-2 extending from the rising distal portions of the rising portions 20b-2. The both rising portions 20b-2 have a sectional shape of a substantially V-shape taken along the Y-axis direction. A rising proximal position BP-2 of each rising portion 20b-2 is common and is a position substantially the same as the center of the hot cathode tube 17 with respect to the Y-axis direction. Accordingly, the rising proximal position BP-2 of each rising portion 20b-2 is a position overlapping with the half width area HW of the diffuser plate 30 and is located in the light source arrangement area LA. This configuration enables the light to be efficiently supplied by the rising portions 20b-2 in the range from the half width area HW of the diffuser plate 30 to the non-half-width area NHW, and is thus suitable for suppression of the uneven brightness.

Third Modified Example of the First Embodiment

Figure 13:
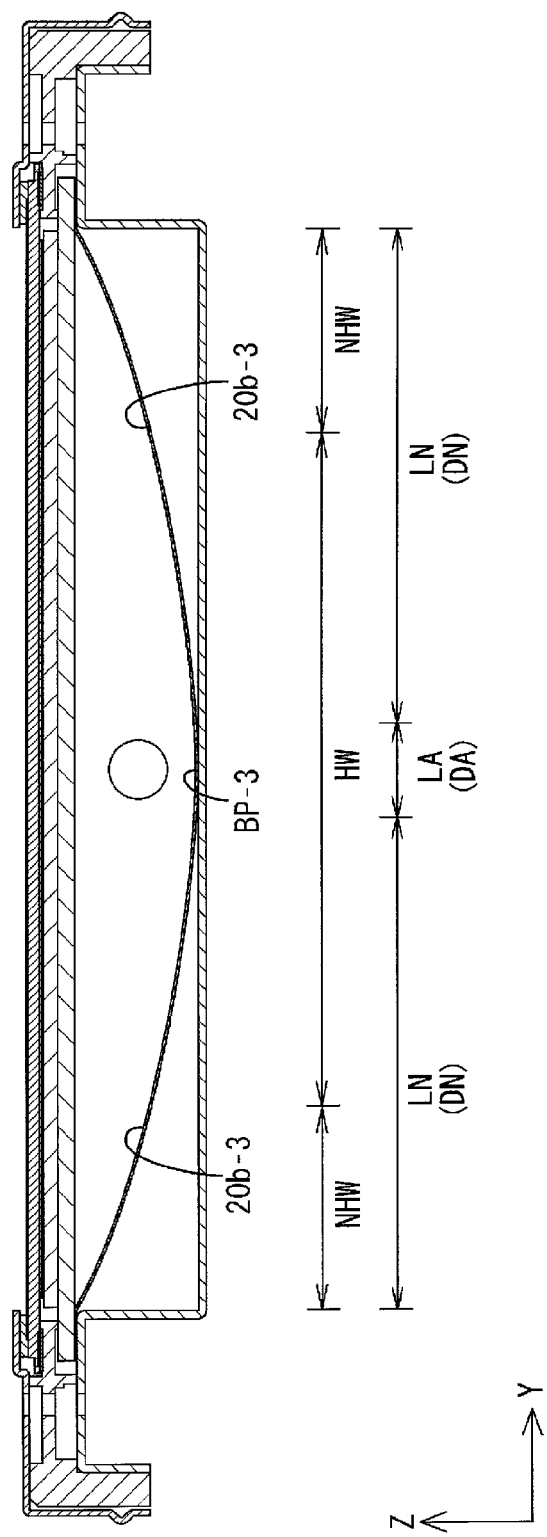
FIG. 13 is a sectional view taken along the short-side direction of the liquid crystal display device using a reflection sheet according to a third modified example of the first embodiment.

A third modified example of the first embodiment will be described with reference to FIG. 13. Here, a configuration in which the shape of rising portions 20b-3 is changed from that of the second modified example described above is illustrated. FIG. 13 is a sectional view taken along the short-side direction of the liquid crystal display device using a reflection sheet according to this modified example.

As shown in FIG. 13, the rising portions 20b-3 have a sectional shape of a substantially arcuate (bow-like shape) taken along the Y-axis direction. Specifically, the rising portions 20b-3 have a substantially arcuate shape curved to the back side, and the entirety thereof is arranged to recede to the bottom plate 14a side from the line (chord) connecting the rising proximal portion and the rising distal portion. A rising proximal position BP-3 of each rising portion 20b-3 is a position overlapping with the half width area HW in the diffuser plate, and is located in the light source arrangement area LA.

Fourth Modified Example of the First Embodiment

Figure 14:
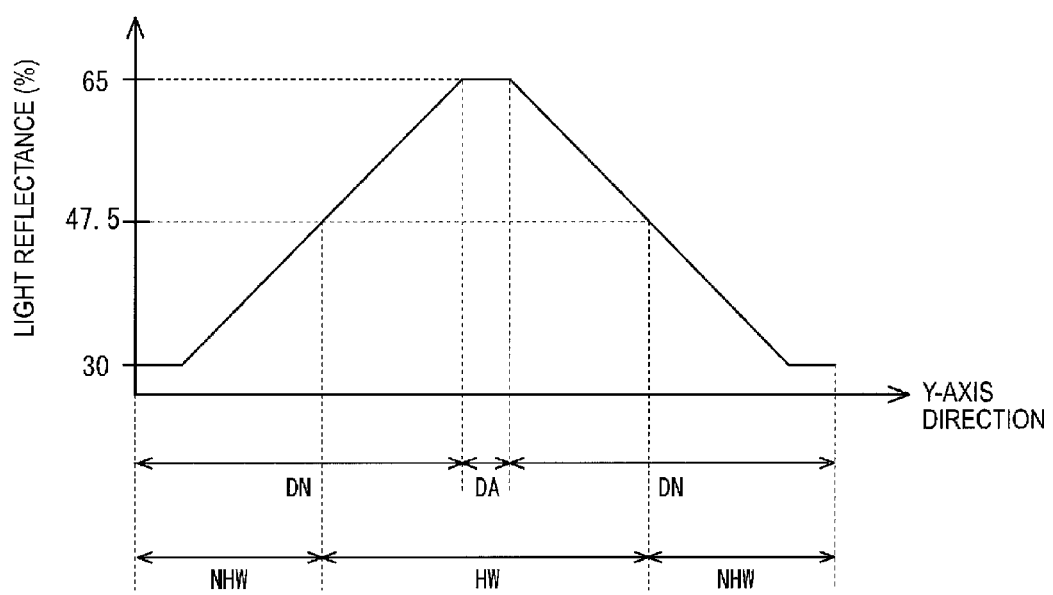
FIG. 14 is a graph showing a change in light reflectance in the short-side direction of a diffuser plate according to a fourth modified example of the first embodiment.

A fourth modified example of the first embodiment will be described with reference to FIG. 14. This example shows a configuration in which the light reflectance distribution in the first surface 30a of the diffuser plate 30 is changed. FIG. 14 is a graph showing a change in light reflectance in the short-side direction of a diffuser plate according to this modified example.

On the first surface 30a of the diffuser plate 30, as shown in FIG. 14, the light source overlapping portion DA has a substantially uniform light reflectance of 65%, for example, which indicates a maximum value within the diffuser plate 30. Meanwhile, the light reflectance in the light source non-overlapping portion DN continuously and gradually decreases (changes into a slope shape) outward from the side close to the light source overlapping portion DA, and indicates a minimum value of 30% at both ends in the short-side direction (Y-axis direction) of the diffuser plate 30. The dots 32a forming the light reflecting portions 32 have a maximum area and are uniformly formed in the light source overlapping portion DA. Meanwhile, in the light source non-overlapping portion DN, the dots are formed to continuously and gradually decrease in reversely proportional to the distance from the light source overlapping portion DA.

Fifth Modified Example of the First Embodiment

Figure 15:
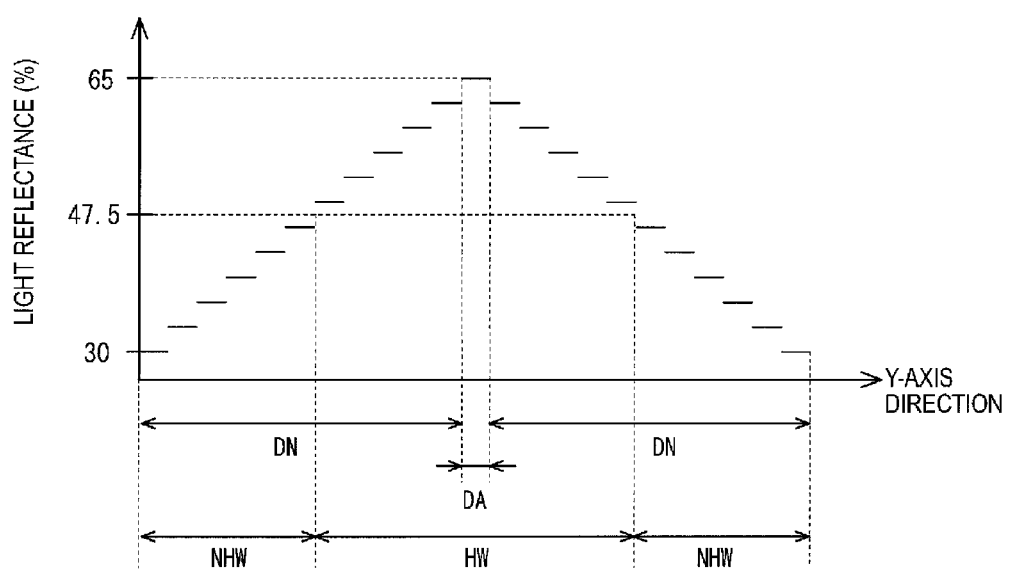
FIG. 15 is a graph showing a change in light reflectance in the short-side direction of a diffuser plate according to a fifth modified example of the first embodiment.

A fifth modified example of the first embodiment will be described with reference to FIG. 15. This example illustrates a configuration in which the light reflectance distribution in the first surface 30a of the diffuser plate 30 is further changed. FIG. 15 is a graph showing a change in light reflectance in the short-side direction of a diffuser according to this modified example.

As shown in FIG. 15, the light reflecting portions 32 are each formed such that the light reflectance within the first surface 30a of the diffuser plate 30 gradually decreases stepwise from the light source overlapping portion DA to the light source non-overlapping portion DN. Specifically, the dots 32a forming the light reflecting portions 32 have a maximum area (light reflectance) and are uniformly formed in the light source overlapping portion DA. Meanwhile, the dots are formed to gradually decrease stepwise for each predetermined area in the direction away from the light source overlapping portion DA, and are smallest at both ends in the short-side direction (Y-axis direction) of the diffuser plate 30. That is, the light reflectance in the light source non-overlapping portion DN of each light reflecting portions 32 changes into a stripe shape along the short-side direction (Y-axis direction) of the diffuser plate 30. This configuration allows the brightness distribution of the illumination light emitted from the diffuser plate 30 to be smooth. Furthermore, according to means for forming a plurality of areas having different light reflectance stepwise, the method for manufacturing the diffuser plate 30 can be simplified, which contributes to a reduction in cost.

Second Embodiment

Figure 16:
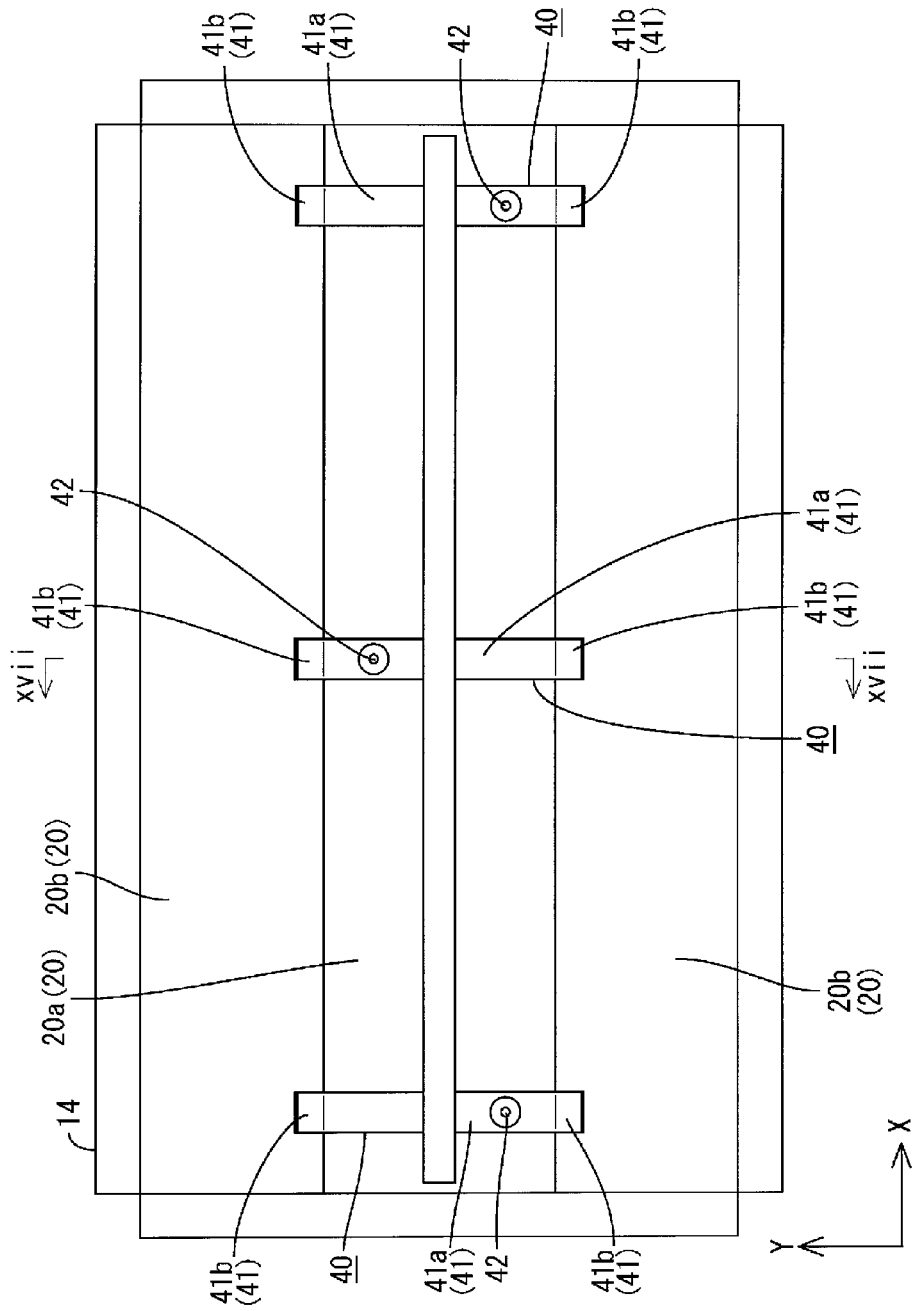
FIG. 16 is a plan view showing an arrangement configuration of a hot cathode tube, a reflection sheet, and pressing members in a chassis according to a second embodiment of the present invention.
Figure 17:
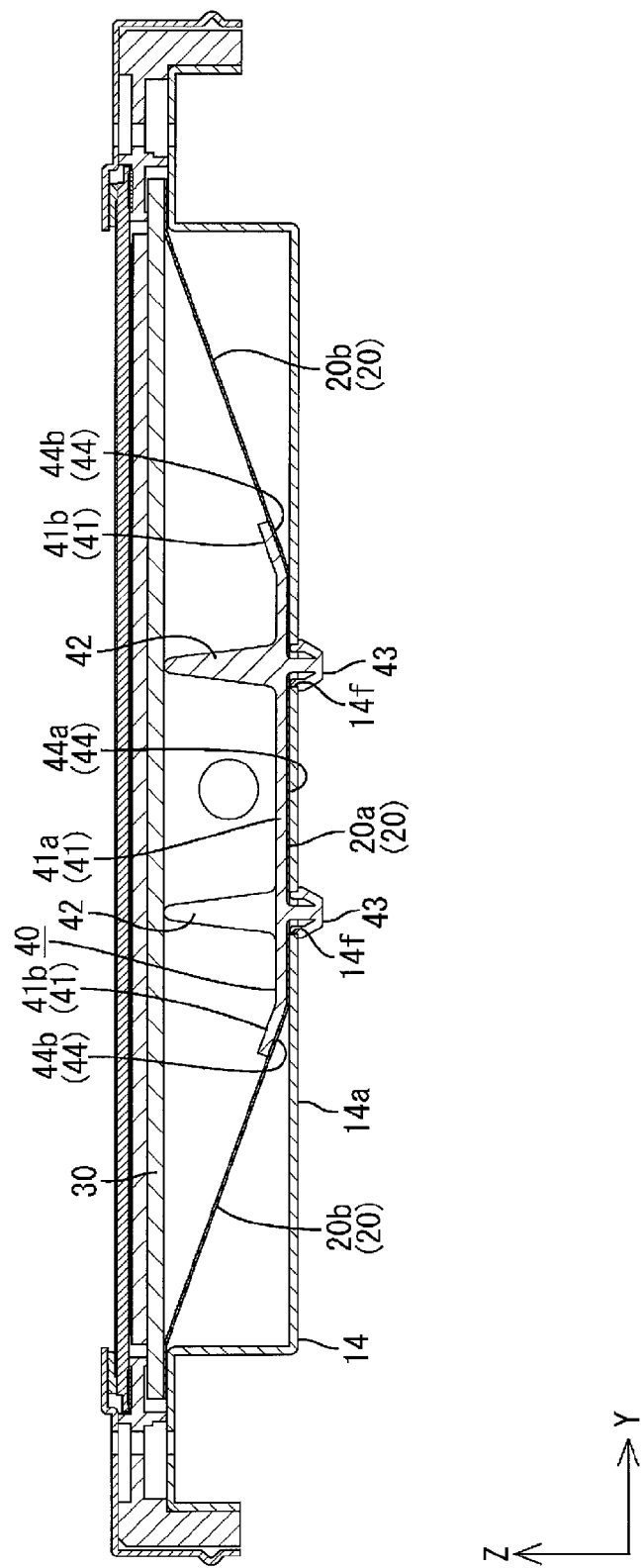
FIG. 17 is a sectional view taken along the line xvii-xvii of FIG. 16.

A second embodiment of the present invention will be described with reference to FIG. 16 or 17. The second embodiment illustrates a configuration including pressing members 40 that presses the reflection sheet 20 from the front side. Note that a redundant explanation of the same components, operations, and effects as those of the above-described first embodiment is not repeated here. FIG. 16 is a plan view showing an arrangement configuration of a hot cathode tube, a reflection sheet, and pressing members in the chassis. FIG. 17 is a sectional view taken along the line xvii-xvii of FIG. 16.

The pressing members 40 are made of synthetic resin (for example, made of polycarbonate), and the entire surface is formed in white-based color such as white, which is excellent for light reflectivity. As shown in FIG. 16, the three pressing members 40 are intermittently arranged side by side at positions spaced apart in the long-side direction within the chassis 14. Specifically, in the short-side direction of the chassis 14, the pressing members 40 are arranged at substantially the center position. Meanwhile, in the long-side direction of the chassis 14, the pressing members 40 are arranged to be dispersed at substantially the center position and at positions in the vicinity of the both end portions.

As shown in FIG. 17, each pressing member 40 includes main body portions 41 having pressing surfaces 44 that press the reflection sheet 20 from the front side (light exit side); supporting portions 42 projecting from the main body portions 41 to the front side (light exit side) and configured to support the diffuser plate 30; and mounting portions 43 projecting from the main body portions 41 to the back side (the side opposite from the light exit side, that is, the bottom plate 14a side in the chassis 14) and configured to mount the pressing member 40 to the chassis 14. Among these components, the main body portions 41 have a rectangular shape (longitudinal shape) in plan view and arranged in the chassis 14 in the state where the long-side direction thereof is allowed to coincide with the Y-axis direction (short-side direction of the chassis 14 and the reflection sheet 20), and the short-side direction is allowed to coincide with the X-axis direction (long-side direction of the chassis 14 and the reflection sheet 20). Further, the long-side dimension of the main body portions 41 is set to be greater than the short-side dimension of the bottom portion 20a of the reflection sheet 20, and a part of the main body portions 41 has a size reaching the rising portions 20b. Accordingly, the main body portion 41 follows the outer shape of the central portion (a portion formed over the bottom portion 20a and the both rising portions 20b) in the short-side direction of the reflection sheet 20, and has a bent shape when viewed from the side. The main body portions 41 have a symmetrical shape with the central position in the long-side direction (between the both rising portions 20b) as a center.

Specifically, the central portion in the long-side direction of the main body portions 41 is referred to as a bottom portion pressing portion 41a overlapping with the bottom portion 20a in plan view and including a bottom pressing surface 44a configured to press the bottom portion 20a from the front side. Meanwhile, the both end portions in the long-side direction of the main body portions 41 are formed to rise from the bottom portion pressing portion 41a to the front side, and are referred to as rising portion pressing portions 41b having rising portion pressing surfaces 44b overlapping with the both rising portions 20b in plan view and configured to press the both rising portions 20b from the front side. That is, the bottom portion pressing portions 41a and the both rising portion pressing portions 41b have the pressing surfaces 44 for the reflection sheet 20 in the entire area, and the pressing surfaces 44 can be formed to press the range covering the bottom portion 20a and the both rising portions 20b in the reflection sheet 20. More specifically, the bottom portion pressing portions 41a have a substantially straight plate shape in parallel with the bottom portion 20a. On the other hand, the rising portion pressing portions 41b have a sloped shape with a certain slope from the rising proximal portion (an end portion close to the bottom portion pressing portions 41a) to the rising distal portion (an end portion away from the bottom portion pressing portion 41a). The inclination angle (angle of bend, rising angle) is substantially the same as the inclination angle of the rising portions 20b with respect to the bottom portion 20a. In short, the rising angle of the rising portion pressing portion 41b is preferably an acute angle (an angle equal to or less than 90 degrees), and more preferably, an angle equal to or less than 45 degrees. Specifically, the angle is about 20 degrees to 30 degrees, for example. The bottom portion pressing portions 41a can press the bottom portion 20a over the total length in the short-side direction. Meanwhile, the both rising portion pressing portions 41b can press a part of the rising portions 20b in the short-side direction thereof, specifically, a portion (rising proximal portion) adjacent to the bottom portion 20a.

The supporting portions 42 can support the optical member 15 from the back side, that is, from the side of the hot cathode tube 17. This makes it possible to constantly regulate the positional relationship (distance, interval) in the Z-axis direction (a direction orthogonal to the plate surface of the optical member 15) of the optical member 15 (especially, the diffuser plate 30) and the hot cathode tube 17. This allows the optical member 15 to exert desired optical functions stably. The supporting portions 42 are provided on the bottom portion pressing portions 41a of the main body portion 41. Specifically, the support portions 42 are arranged at the positions decentered from one end portion in the long-side direction of the bottom portion pressing portions 41a. Note that the pressing members 40 arranged along the long-side direction within the chassis 14 are arranged in the direction in which the adjacent supporting portions 42 are formed in a staggered shape (FIG. 16). The supporting portions 42 have a conical shape as a whole in which the Z-axis direction (a direction substantially orthogonal to the plate surface of the diffuser plate 30) is allowed to coincide with the axial direction. Specifically, the support portions 42 have a circular sectional shape taken along the plate surface of each bottom portion pressing portion 41a, and are formed in a tapered shape in which the diameter dimension gradually decreases from the projecting proximal portion side to the projecting distal portion side.

The mounting portions 43 can hold the pressing members 40 in the mounted state on the chassis 14 by inserting and locking the mounting portions 43 into mounting holes 14f formed in the bottom plate 14a of the chassis 14. A pair of the mounting portions 43 is provided on the bottom portion pressing portions 41a of the main body portions 41. Specifically, the mounting portions 43 are arranged side by side at positions spaced apart in the long-side direction (Y-axis direction) of the bottom portion pressing portions 41a. One of the pair of mounting portions 43 is arranged at the position overlapping with the supporting portion 42 on the front side in plan view, specifically, at the concentric position. Each mounting portion 43 includes a locking part which is elastically deformable during the process of being inserted into each mounting hole 14f. This locking part is locked to the edge portion of each mounting hole 14f from the back side, thereby making it possible to retain the pressing members 40 in the mounted state on the chassis 14. Note that insertion holes which communicate with the mounting holes 14f and through which the mounting portions 43 can be inserted is opened and formed at the positions corresponding to the mounting holes 14f in the bottom portion 20a of the reflection sheet 20.

As described above, according to this embodiment, there are provided the pressing members 40 arranged over the bottom portion 20a and the rising portions 20b and having a pressing surface 44 configured to press the bottom portion 20a and the rising portions 20b from the side of the diffuser plate 30. The rising portions 20b of the reflection sheet 20 are formed to rise from the bottom portion 20a to the side of the diffuser plate 30. Accordingly, the rising angle from the base portion 20a, for example, fluctuates, and deformation such as warping or bending occurs, for example. Thus, the shape tends to be unstable. In this regard, according to this embodiment, each pressing member 40 includes the pressing surface 44 arranged over the bottom portion 20a and the rising portions 20b of the reflection sheet 20. The pressing surface 44 presses the bottom portion 20a and the rising portions 20b from the side of the diffuser plate 30, thereby making it possible to regulate the rising portions 20b from being displaced to the side of the diffuser plate 30. This suppresses fluctuation in the rising angle of each rising portion 20b with respect to the bottom portion 20a and occurrence of a deformation, such as warping or bending, in each rising portion 20b. That is, since the shape of each rising portion 20b can be stably retained, thereby stabilizing the directivity of the reflected light. Accordingly, unevenness in the light emitted from the backlight unit 12 hardly occurs.

Third Embodiment

Figure 18:
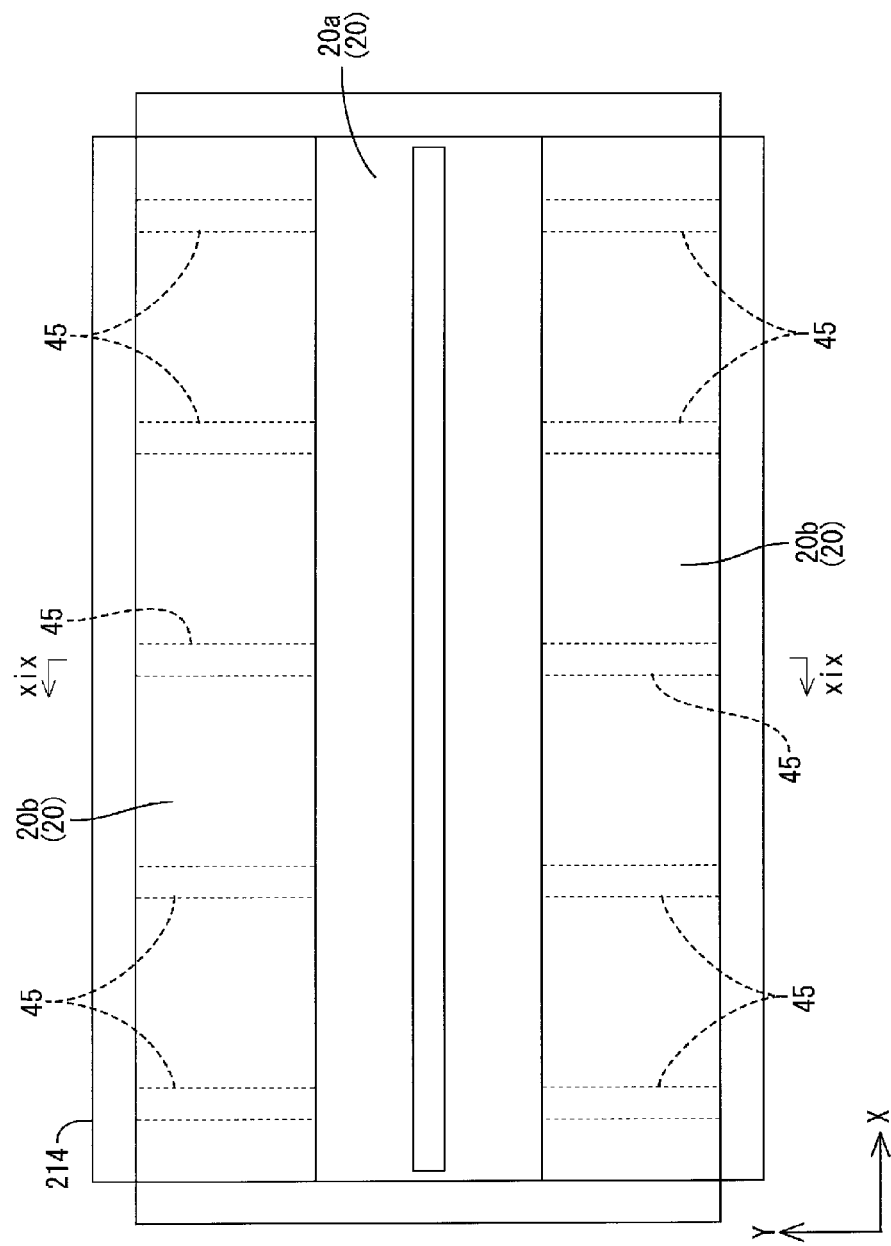
FIG. 18 is a plan view showing an arrangement configuration of a hot cathode tube and a reflection sheet in a chassis according to a third embodiment of the present invention.
Figure 19:
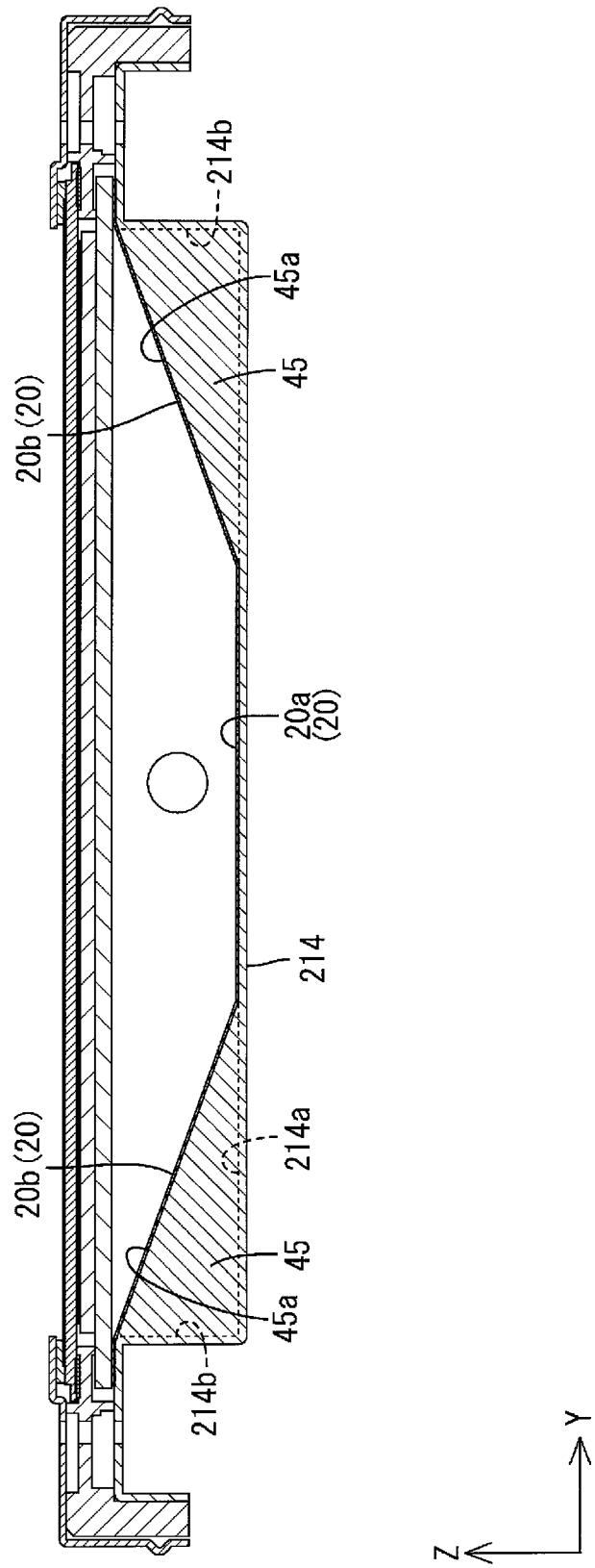
FIG. 19 is a sectional view taken along the line xix-xix of FIG. 18.

A third embodiment of the present invention will be described with reference to FIG. 18 or 19. The third embodiment illustrates a configuration in which the shape of a chassis 214 is changed. Note that a redundant explanation of the same components, operations, and effects as those of the above-described first embodiment is not repeated here. FIG. 18 is a plan view showing an arrangement configuration of a hot cathode tube and a reflection sheet in the chassis. FIG. 19 is a sectional view taken along the line xix-xix of FIG. 18.

As shown in FIGS. 18 and 19, receiving portions 45 configured to receive the rising portions 20b of the reflection sheet 20 from the back side (the side opposite from the light exit side) are provided in the chassis 214. The receiving portions 45 have a wall shape (plate shape) rising from a bottom plate 214a to the front side, and the principal wall surface (principal plate surface) thereof coincides with the Y-axis direction and the plate thickness direction thereof coincides with the X-axis direction. The receiving portions 45 can be interposed between the bottom plate 214a and the rising portions 20b. The receiving portions 45 are arranged at the positions overlapping with the rising portions 20b in plan view in the bottom plate 214a. The five receiving portions 45 are arranged side by side at the positions spaced apart in the X-axis direction, and are arrayed at substantially equal pitches. In each receiving portion 45, the receiving portion 45 positioned at the center with respect to the X-axis direction is arranged at the center position in the long-side direction of the chassis 214. The receiving portion 45 has a substantially triangular sectional shape taken along the Y-axis direction, and is formed to follow the space (gap) surrounded by the rising portions 20b, the bottom plate 214a, and side plates 214b. A surface facing the front side of the receiving portions 45 (a surface opposed to the rising portions 20b) has a sloped shape with respect to both the bottom plate 214a and the side plates 214b (the Y-axis direction and the Z-axis direction). This is defined as a receiving surface 45a configured to receive apart of the rising portions 20b from the back side. The receiving surface 45a is formed to extend (in parallel) along the rising portions 20b. The angle (inclination angle) formed by the receiving surface 45a with respect to the bottom plate 214a (the Y-axis direction, that is, the direction from the bottom portion 20a to the rising portions 20b) is substantially the same as the rising angle of each rising portion 20b from the bottom portion 20a, thereby providing a configuration in which little gap is held between each rising portion 20b and each receiving surface 45a of the receiving portions 45. Each receiving portion 45 is formed to be continuous with the inner surface of each of the bottom plate 214a and the side plates 214b, thereby achieving an improvement in strength of the chassis 214.

As described above, according to this embodiment, the receiving portions 45 configured to receive the rising portions 214b from the side of the bottom plate 214a are provided between the bottom plate 214a and the rising portions 214b. The rising portions 20b of the reflection sheet 20 are formed to rise from the bottom plate 214a side toward the diffuser plate 30. Accordingly, the rising angle from the bottom plate 214a side, for example, fluctuates, and deformation such as warping or bending occurs, for example. Thus, the shape tends to be unstable. In this regard, according to this embodiment, the receiving portions 45 can receive the rising portions 20b from the side of the bottom plate 214a, thereby making it possible to regulate the rising portions 20b from being displaced toward the bottom plate 214a. This suppresses fluctuation of the rising angle of the rising portions 20b from the bottom plate 214a side, or occurrence of deformation such as warping or bending in the rising portions 20b. That is, since the shape of each rising portion 20b can be stably retained, thereby stabilizing the directivity of the reflected light. Accordingly, unevenness in the light emitted from the backlight unit 12 hardly occurs.

Fourth Embodiment

Figure 20:
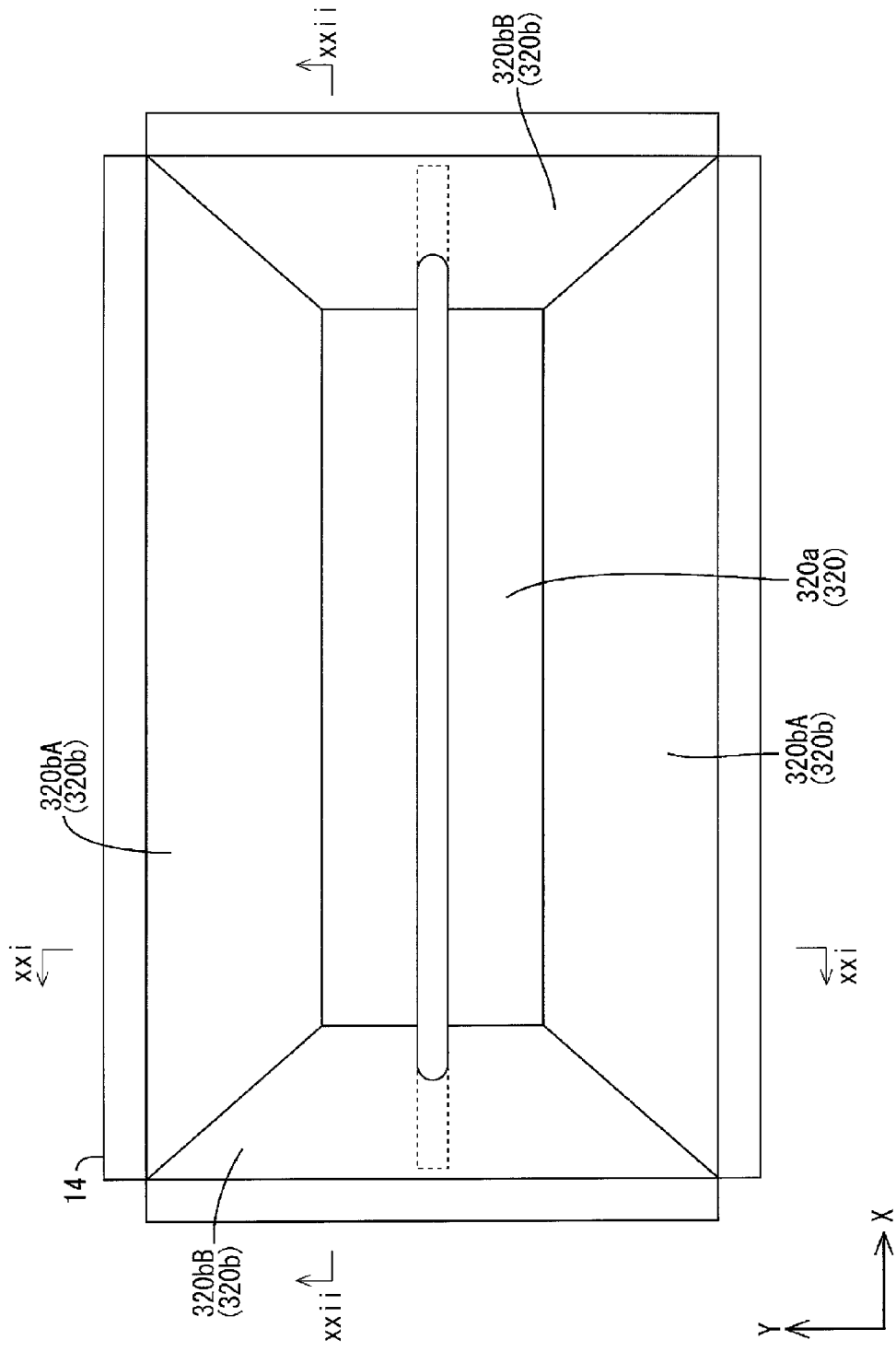
FIG. 20 is a plan view showing an arrangement configuration of a hot cathode tube and a reflection sheet in a chassis according to a fourth embodiment of the present invention.
Figure 21:
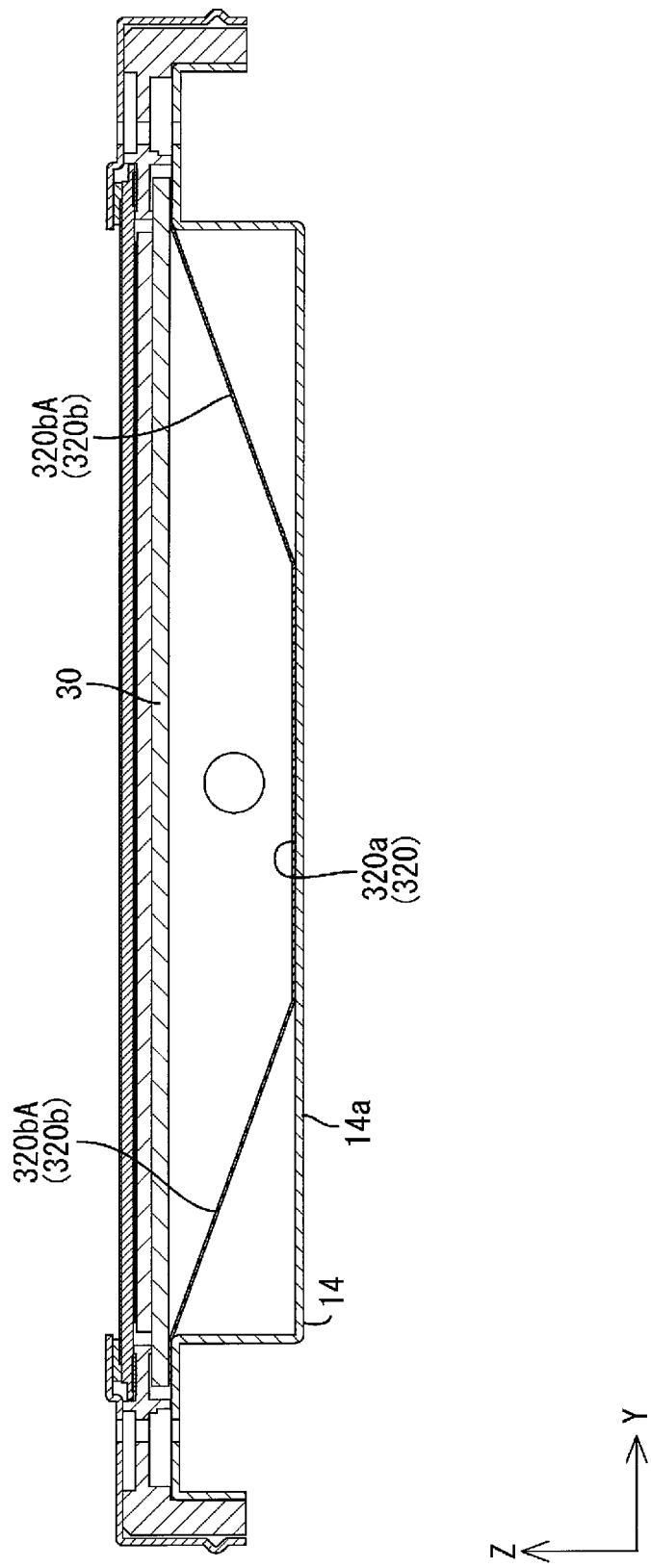
FIG. 21 is a sectional view taken along the line xxi-xxi of FIG. 20.
Figure 22:
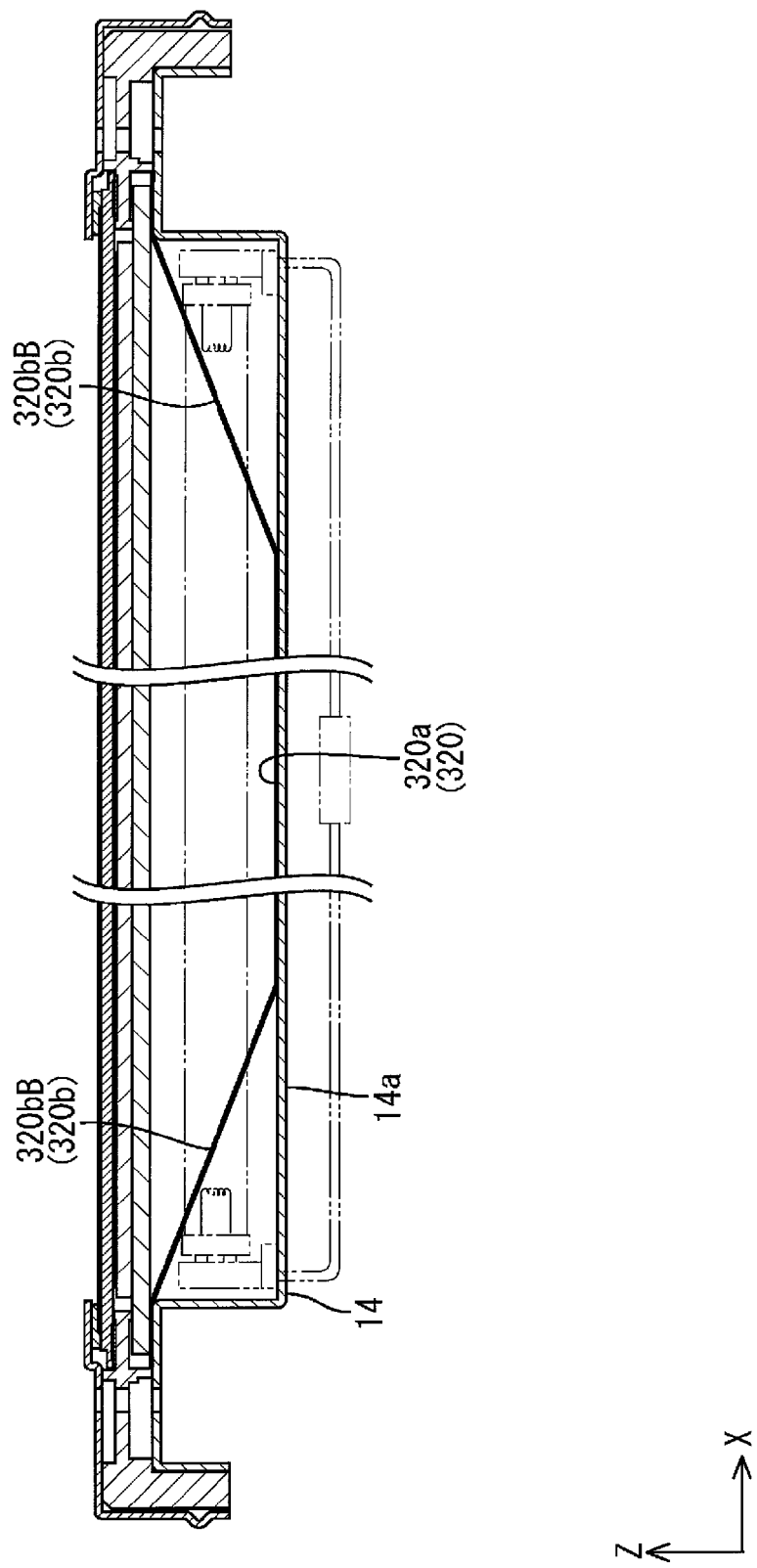
FIG. 22 is a sectional view taken along the line xxii-xxii of FIG. 20.

A fourth embodiment of the present invention will be described with reference to FIGS. 20 to 22. The fourth embodiment illustrates a configuration in which the shape of a reflection sheet 320 is changed. Note that a redundant explanation of the same components, operations, and effects as those of the above-described first embodiment is not repeated here. FIG. 20 is a plan view showing an arrangement configuration of a hot cathode tube and a reflection sheet in the chassis. FIG. 21 is a sectional view taken along the line xxi-xxi of FIG. 20. FIG. 22 is a sectional view taken along the line xxii-xxii of FIG. 20.

As shown in FIGS. 20 to 22, the reflection sheet 320 is formed in a bowl shape as a whole, and includes a bottom portion 320a, which is provided in a middle portion of the bottom plate 14a of the chassis 14, and four rising portions 320b in total which respectively rise from the both ends on the long side of the bottom portion 320a and from the both ends on the short side thereof. The rising portions 320b include a pair of first rising portions 320bA, which rises from the both ends on the long side of the bottom portion 320a and are provided at positions sandwiching the bottom portion 320a in the Y-axis direction, and a pair of second rising portions 320bB, which rises from the both ends on the short side of the bottom portion 320a, is provided at positions sandwiching the bottom portion 320a in the X-axis direction, and is adjacent to the first rising portion 320bA. The first rising portions 320bA and the second rising portions 320b have an inclined shape rising with a predetermined rising angle from the bottom portion 320a. The first rising portions 320bA and the second rising portions 320bB are formed to continuous with each other, and are bent at a boundary position thereof. Note that the diffuser plate 30 used in this embodiment has the same light reflective ability as that of the first embodiment described above. Accordingly, in the first rising portions 320bA and the second rising portions 320bB, the rising proximal position of each first rising portion 320bA may be set to overlap with the half width area.

Fifth Embodiment

Figure 23:
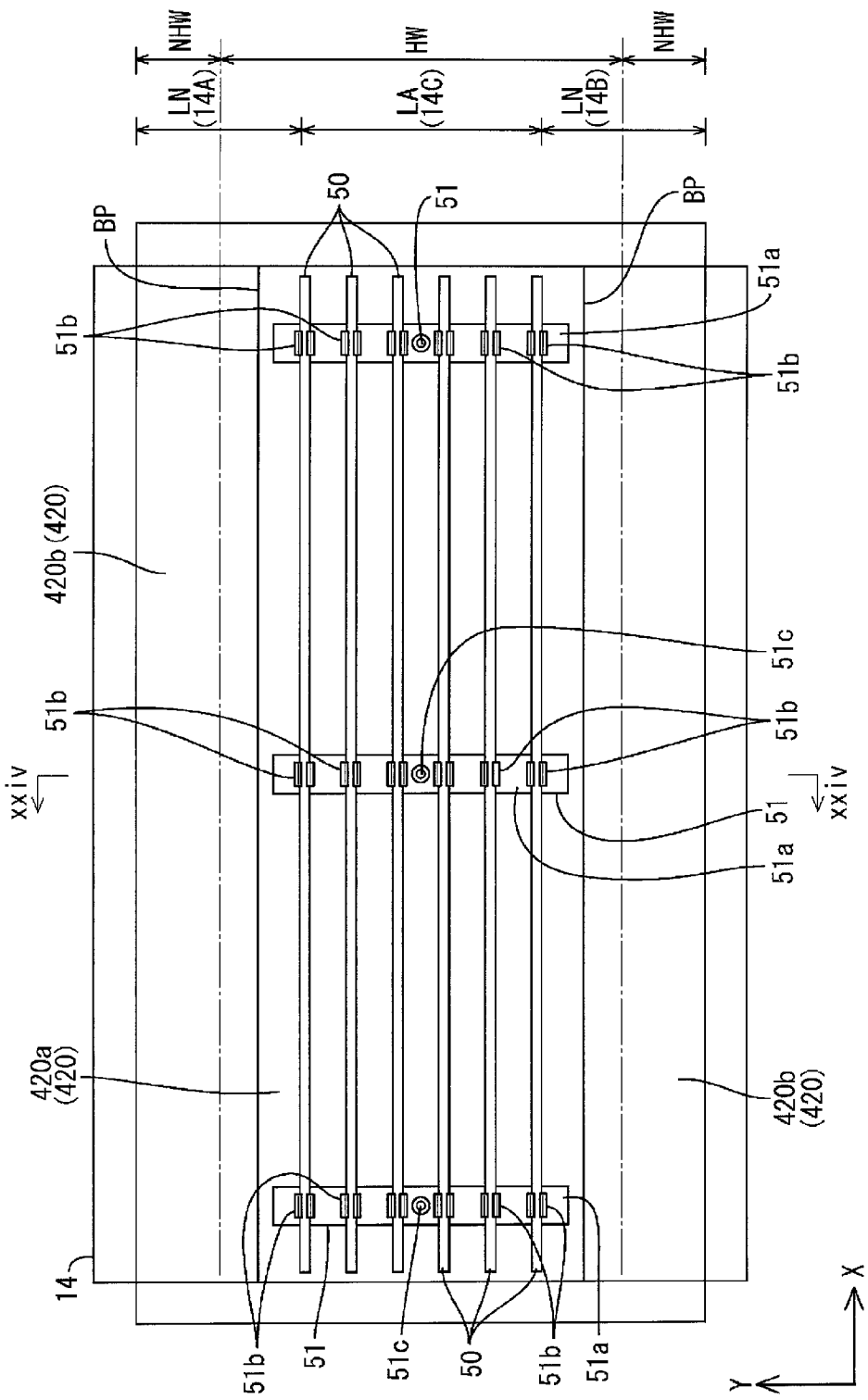
FIG. 23 is a plan view showing an arrangement configuration of cold cathode tubes, light source holding members, and a reflection sheet in a chassis according to a fifth embodiment of the present invention.
Figure 24:
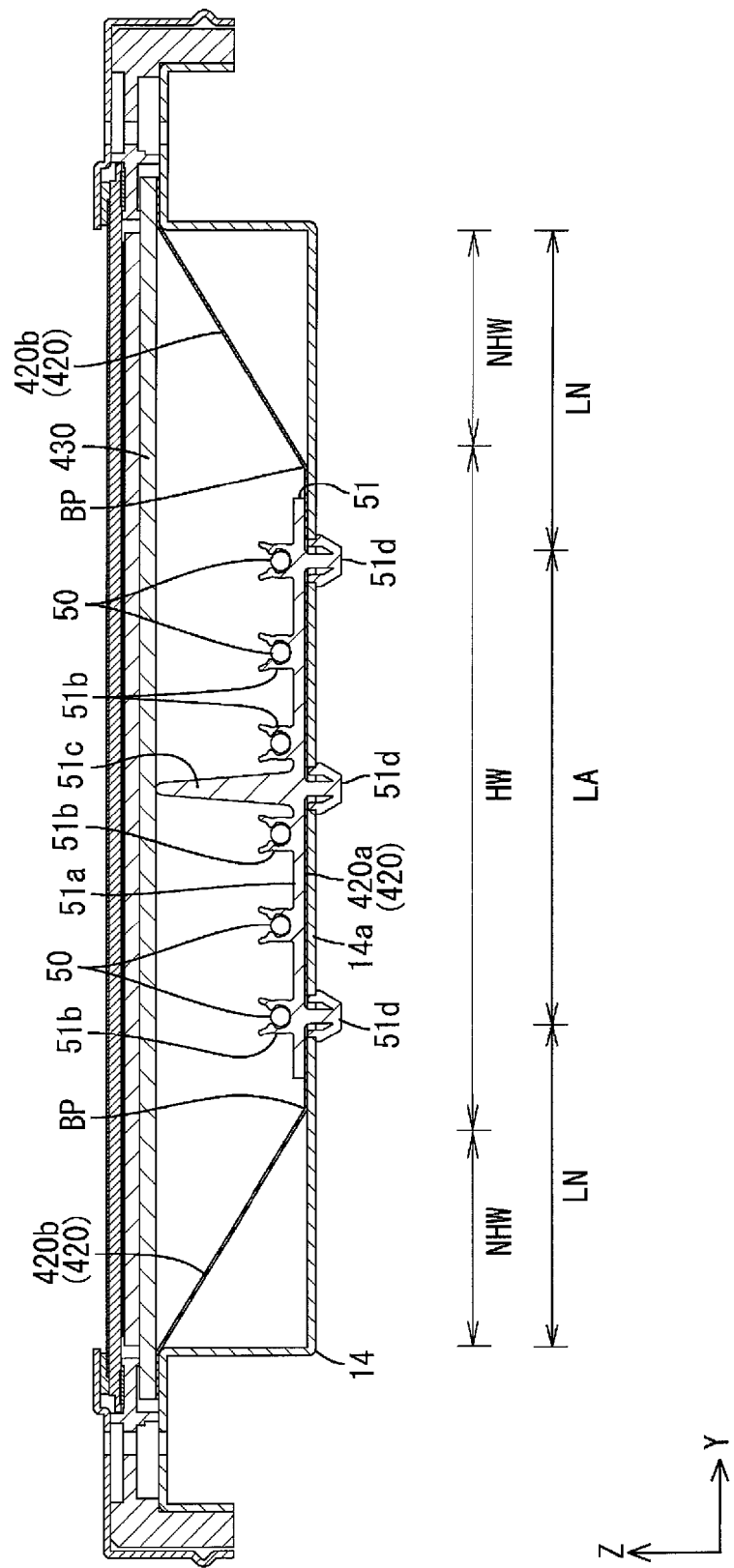
FIG. 24 is a sectional view taken along the line xxiv-xxiv of FIG. 23.

A fifth embodiment of the present invention will be described with reference to FIG. 23 or 24. The fifth embodiment illustrates a configuration in which cold cathode tubes 50 are used as the light source and light source holding members 51 are added. Note that a redundant explanation of the same components, operations, and effects as those of the above-described first embodiment is not repeated here. FIG. 23 is a plan view showing an arrangement configuration of cold cathode tubes, light source holding members, and a reflection sheet in the chassis. FIG. 24 is a sectional view taken along the line xxiv-xxiv of FIG. 23.

As shown in FIGS. 23 and 24, each cold cathode tube 50 forming the light source (linear light source) in this embodiment has an elongated tubular shape (linear shape), and includes a hollow elongated glass tube having sealed both end portions, and a pair of electrodes enclosed in the both end portions of the glass tube. Mercury, rare gas, and the like are enclosed in the glass tube and a fluorescent material is applied onto the inner wall thereof. Relay connectors (not shown) are provided at both ends of the cold cathode tube 50, and the relay connectors are connected to lead terminals projecting outside of the glass tube from the electrodes. The cold cathode tube 50 is connected to an inverter board (not shown) mounted on the outer surface side of the bottom plate 14a of the chassis 14 through the relay connectors, and the driving thereof can be controlled. Note that the outer diameter dimension of the cold cathode tube 50 is smaller than the outer diameter dimension (for example, about 15.5 mm) of the hot cathode tube 17 illustrated in the first embodiment, and is about 4 mm, for example.

Six cold cathode tubes 50 each having the above-described configuration are arranged in parallel at predetermined intervals (array pitch) and housed in the chassis 14 in an eccentrically located form in the state where the lengthwise direction (axis direction) thereof coincides with the long-side direction of the chassis 14. More specifically, when the bottom plate 14a (a portion opposed to the diffuser plate 30) of the chassis 14 is equally partitioned into the first end portion 14A in the short-side direction, the second end portion 14B positioned at the end portion on the side opposite from the first end portion 14A, and the central portion 14C sandwiched between the first end portion 14A and the second end portion 14B, the cold cathode tubes 50 are arranged in the central portion 14C of the bottom plate 14a and the light source arrangement area LA is formed therein. The light source arrangement area LA according to this embodiment is larger than that of the first embodiment. Meanwhile, the cold cathode tube 50 is not arranged in any of the first end portion 14A and the second end portion 14B of the bottom plate 14a, but the light source non-arrangement area LN is formed therein. Specifically, the cold cathode tubes 50 form the light source arrangement area LA in the form of being eccentrically located at the central portion in the short-side direction of the bottom plate 14a of the chassis 14. The area of the light source arrangement area LA is larger than the area of each light source non-arrangement area LN. Furthermore, the ratio of the area (the length dimension in the Y-axis direction) of the light source arrangement area LA to the entire screen area (the longitudinal dimension (short-side dimension) of the screen) is larger than that of the first embodiment, and is about 42%, for example. A pair of the light source non-arrangement areas LN has substantially the same area. The cold cathode tubes 50 are formed to have a length dimension substantially equal to the horizontal dimension (long-side dimension) of the screen.

The short-side dimension of a bottom portion 420a of the reflection sheet 420 is set to be slightly wider than the light source arrangement area LA of the bottom plate 14a of the chassis 14, and the bottom portion 420a overlaps, in plan view, with the light source arrangement area LA. Specifically, the formation range of the bottom portion 420a is expanded according to the light source arrangement area LA, and the formation range in the rising portion 420b corresponding to the light source non-arrangement area LN is reduced. Accordingly, the rising angle of each rising portion 420b from the bottom portion 420a is set to be larger than that of the first embodiment. On the other hand, the half width area HW of a diffuser plate 430 is expanded along with the expansion of each of the light source arrangement area LA and the bottom portion 420a. In association with this, the width dimension of the non-half-width area NHW is reduced. The rising proximal positions BP of the rising portions 420b are set to overlap with the half width area HW, as in the first embodiment.

The bottom plate 14a of the chassis 14 is mounted with the light source holding members 51 for holding the cold cathode tubes 50. Each light source holding member 51 includes a main body portion 51a that can sandwich the bottom portion 420a with the bottom plate 14a; light source holding portions 51b projecting from the main body portion 51a to the front side and configured to support the cold cathode tube 50; a support portion 51c projecting from the main body portion 51a to the front side and configured to support the diffuser plate 430 from the back side; and mounting portions 51d projecting from the main body portion 51a to the back side and mounted to the bottom plate 14a. Among these components, the six light source holding portions 51b are arranged in parallel at predetermined intervals in the long-side direction on the main body portion 51a, and the arrangement pitch thereof is the same as the arrangement pitch between the cold cathode tubes 50. Each light source holding portion 51b includes a pair of arm portions and is configured to mount/dismount the cold cathode tubes 50 through the gap held between tip end portions of the both arm portions. The both arm portions are formed to be elastically deformed while being opened outward during mounting/dismounting of the cold cathode tubes 50, thereby making it possible to elastically hold each cold cathode tube 50 between the both arm portions. The light source holding portions 51b enable the cold cathode tubes 50 to be held in the straight state with respect to the axial direction, and maintain the positional relationship between the cold cathode tubes 50 and the diffuser plate 430 with respect to the Z-axis direction to be constant.

Note that the main body portion 51a has substantially the same configuration as the bottom portion pressing portion 41a (see FIG. 17) of the pressing member 40 illustrated in the second embodiment described above. The support portion 51c has substantially the same configuration as the support portion 42 (see FIG. 17) of the pressing member 40 illustrated in the above-mentioned second embodiment. The mounting portions 51d have substantially the same configuration as the mounting portions 43 (see FIG. 17) of the pressing member 40 illustrated in the above-mentioned second embodiment. Accordingly, a redundant explanation thereof is not repeated here.

As described above, according to this embodiment, the light source is formed of the cold cathode tubes 50. With this configuration, a longer service life can be achieved, and adjustment of light can be facilitated.

Sixth Embodiment

Figure 25:
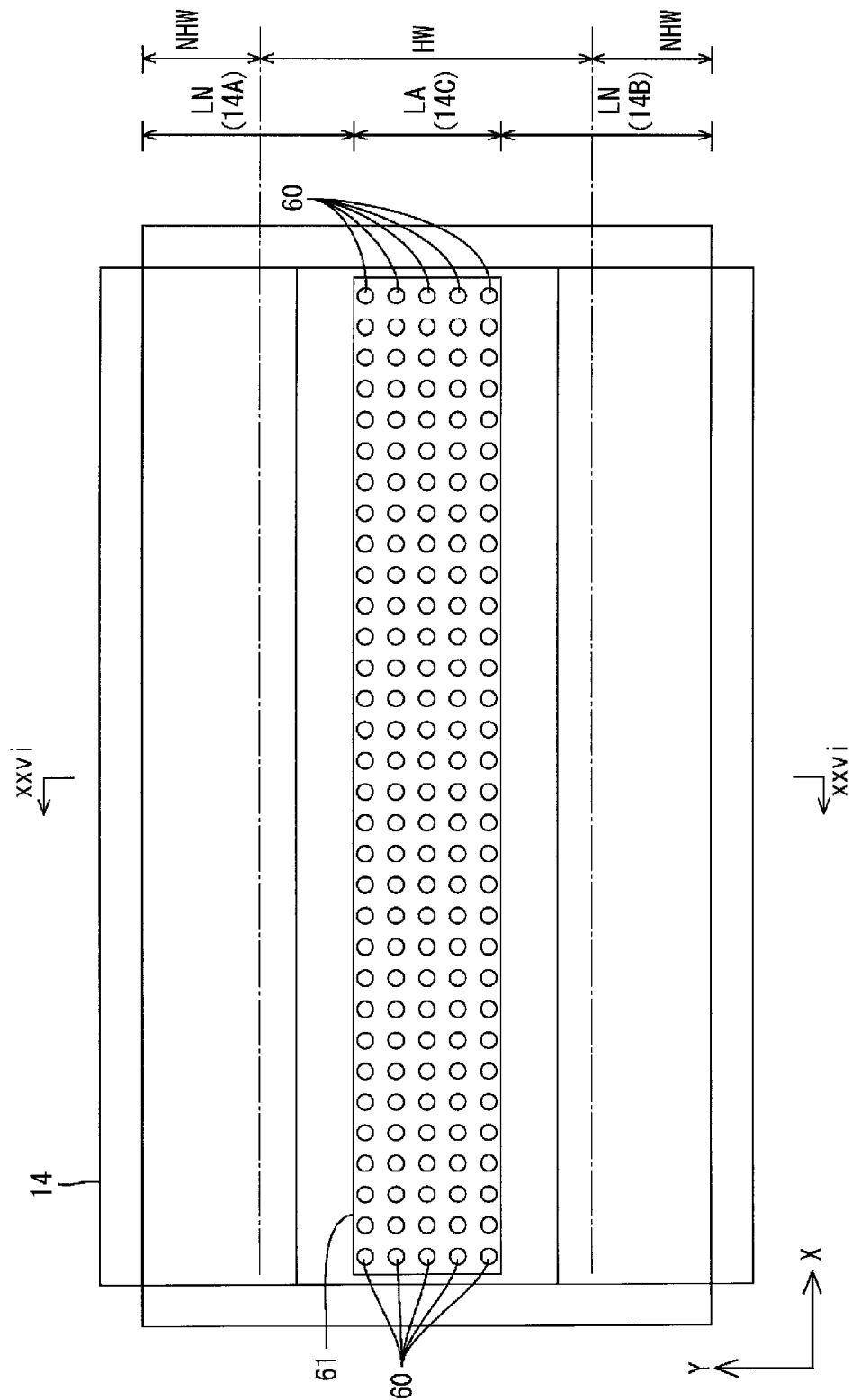
FIG. 25 is a plan view showing an arrangement configuration of LEDs and a reflection sheet in a chassis according to a sixth embodiment of the present invention.
Figure 26:
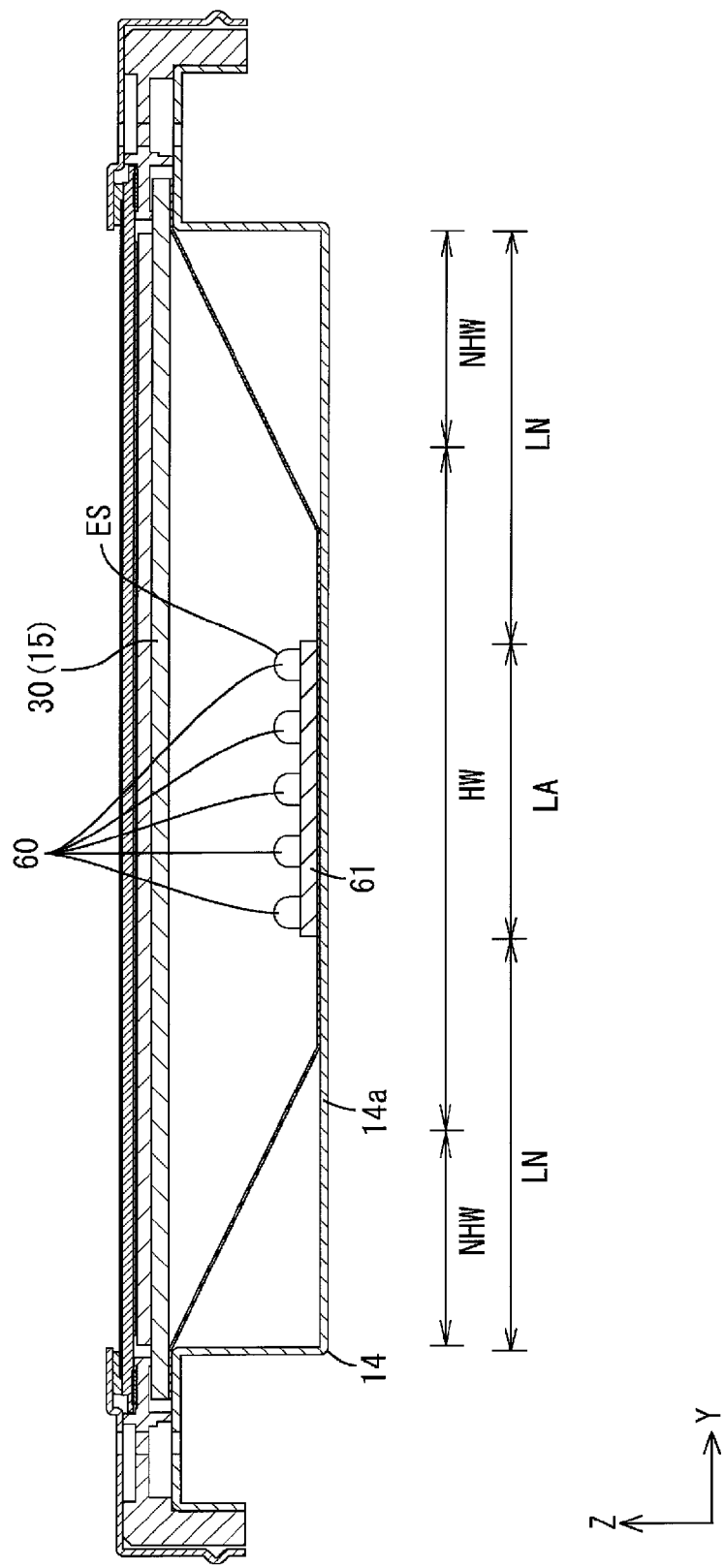
FIG. 26 is a sectional view taken along the line xxvi-xxvi of FIG. 25.

A sixth embodiment of the present invention will be described with reference to FIG. 25 or 26. This sixth embodiment illustrates the case where LEDs 60 are used as the light source. Note that a redundant explanation of the same components, operations, and effects as those of the above-described first embodiment is not repeated here. FIG. 25 is a plan view showing an arrangement configuration of LEDs and a reflection sheet in the chassis. FIG. 26 is a sectional view taken along the line xxvi-xxvi of FIG. 25.

In this embodiment, as shown in FIGS. 25 and 26, a number of LEDs 60 forming the light source are mounted on an LED board 61 housed in the chassis 14, thereby forming the linear light source extending along the X-axis direction as a whole. The front surface of the LED board 61 is made of synthetic resin having white color which is excellent for the light reflectivity, and is provided to extend along the bottom plate 14a of the chassis 14 and fixed to the bottom plate 14a by fixing means which is not shown. The LED board 61 has a long rectangular shape in plan view, and is mounted on the bottom plate 14a in the state where the long-side direction thereof coincides with the long-side direction of the chassis 14. The short-side dimension of the LED board 61 is smaller than the longitudinal dimension of the screen (the short-side dimension of the chassis 14), and the long-side dimension of the LED board 61 is substantially the same as the horizontal dimension of the screen (the long-side dimension of the chassis 14). The LED board 61 has a wiring pattern formed of a metal film and is mounted with the LEDs 60 at predetermined positions. The LED board 61 is connected to an external control board which is not shown. An electric power necessary for turning on the LEDs 60 is supplied from the external control board, and the driving of the LEDs 60 can be controlled.

The LEDs 60 are so-called front surface mounting type LEDs which are mounted on the front surface of the LED board 61. A number of the LEDs 60 are arranged in parallel in a grid (in a matrix) in the X-axis direction and the Y-axis direction on the front side surface of the LED board 61. Each LED 60 has a configuration in which LED chips are sealed by a resin material on a board portion fixed to the LED board 61. There are three types of LED chips mounted on the board portion, and the LED chips have different principal luminous wavelengths. Specifically, the LED chips are configured to emit light for each color of R (red), G (green), and B (blue). The LEDs 60 are top-type LEDs whose surface on the side opposite from the mounting surface with respect to the LED board 61 corresponds to the light emitting surface ES. The optical axis of each LED 60 substantially coincides with the Z-axis direction (a direction orthogonal to the plate surface of each of the liquid crystal panel 11 and the optical member 15).

When the bottom plate 14a (the portion opposite to the diffuser plate 30) of the chassis 14 is equally partitioned into the first end portion 14A in the short-side direction, the second end portion 14B positioned at the end portion on the side opposite to the first end portion 14A, and the central portion 14C sandwiched therebetween, the LED board 61 on which a number of LEDs 60 are mounted is arranged in the central portion 14C of the bottom plate 14a, and forms the light source arrangement area LA therein. Meanwhile, the LED board 61 is not arranged in each of the first end portion 14A and the second end portion 14B of the bottom plate 14a, but the light source non-arrangement area LN is formed therein. Specifically, the LEDs 60 and the LED board 61 form the light source arrangement area LA in the eccentrically located portion at the central portion in the short-side direction of the bottom plate 14a of the chassis 14. Note that the ratio of area (the length dimension in the Y-axis direction) of the light source arrangement area LA to the entire area of the screen (the longitudinal dimension (short-side dimension) of the screen) can be appropriately set and may be set to be equal to that of the first embodiment or the fourth embodiment. More alternatively, the ratio may be set to values other than the values shown in the first and fourth embodiments.

As described above, according to this embodiment, the light source is formed of LEDs 60. With this configuration, a longer service life and a lower power consumption, for example, can be achieved.

Other Embodiment

The present invention is not limited to the embodiments described above with reference to the description and drawings. For example, the following embodiments can also be included in the technical scope of the present invention.

(1) Each embodiment described above illustrates the configuration in which the rising proximal position of the rising portion of the reflection sheet is arranged in the light source non-arrangement area. However, the present invention also includes a configuration in which the rising proximal position of the rising portion is arranged in the light source arrangement area, as long as the rising proximal position overlaps with the non-half-width area of the diffuser plate.

(2) In addition to the above-described embodiments, the shape of the rising portion can be changed as needed. Specifically, the sectional shape of the rising portion may be a curved shape (a quadratic curve shape, an elliptical shape, or the like) other than the arcuate shape.

(3) Each embodiment described above illustrates the configuration in which the angle formed by the rising portion with respect to the Y-axis direction is an acute angle which is equal to or less than 45 degrees. However, the present invention also includes a configuration in which the angle is an acute angle equal to or larger than 45 degrees.

(4) Though each embodiment described above illustrates the configuration in which the rising portion is provided at the end portion in the short-side direction of the reflection sheet, the present invention is also applicable to a configuration in which the rising portion is formed at an end portion in the long-side direction. In addition to this, the present invention is also applicable to a configuration in which a rising portion having a mountain-like sectional shape at the middle portion of the reflection sheet, for example, is provided.

(5) The pressing member described in the second embodiment described above may be used in the first to third modified examples of the first embodiment and the fourth embodiment, as a matter of course. Furthermore, the main body portion in the light source holding member described in the fifth embodiment may be provided with the rising portion pressing portion described in the second embodiment.

(6) The receiving portion described in the third embodiment described above may be used in the first to third modified examples of the first embodiment and the fourth embodiment, as a matter of course.

(7) Though each embodiment described above illustrates the case where the chassis made of synthetic resin is used, the present invention is also applicable to a chassis made of metal.

(8) Each embodiment described above illustrates the reflection sheet having a form in which the bottom portion and the rising portion are continuously formed. However, the present invention is also applicable to a form using a reflection sheet of a separated configuration in which the bottom portion and the rising portion are separated.

(9) In the above-mentioned fourth embodiment, the cold cathode tube described in the fifth embodiment and the LEDs described in the sixth embodiment may be used as the light source.

(10) Though the above-described first embodiment illustrates the configuration in which a single hot cathode tube is used as the light source, the number of hot cathode tubes to be used can be changed and two or more hot cathode tubes may be used. Specifically, when two hot cathode tubes are used, for example, the ratio of the light source arrangement area to the longitudinal dimension of the screen is preferably about 37%, for example. Note that when three or more hot cathode tubes are used, the ratio of the light source arrangement area may be adjusted in proportional to the number of hot cathode tubes.

(11) Though the above-described fifth embodiment illustrates the configuration in which six cold cathode tubes are used as the light source, the number of cold cathode tubes to be used can be changed, and five or less or seven or more cold cathode tubes may be used. Specifically, when four cold cathode tubes are used, for example, the ratio of the light source arrangement area to the longitudinal dimension of the screen is preferably about 26%, for example. When eight cold cathode tubes are used, for example, the ratio of the light source arrangement area to the longitudinal dimension of the screen is preferably about 58%, for example. When the number of cold cathode tubes to be used is changed to the number other than these numbers, the ratio of the light source arrangement area may be adjusted in proportional to the number of cold cathode tubes to be used.

(12) In the above-described sixth embodiment, the size of the LED board with respect to the chassis, the installation position and the installation number of the LEDs on the LED board can be changed as needed.

(13) Each embodiment described above illustrates a configuration in which the central portion of the chassis is used as the light source arrangement area and the first end portions and the second end portion are used as the light source non-arrangement area. However, the present invention also includes a configuration in which at least one of the first end portion and the second end portion of the chassis is used as the light source arrangement area, and the other portions are used as the light source non-arrangement area. In this case, both the first end portion and the central portion may be used as the light source arrangement area, or both the second end portion and the central portion may be used as the light source arrangement area.

(14) Each embodiment described above illustrates the configuration in which the light sources are eccentrically located and arranged in the chassis (the configuration including both the light source arrangement area and the light source non-arrangement area). However, the present invention is also applicable to a configuration in which the light sources are evenly arranged over the entire area of the chassis.

(15) The above-described first to fifth embodiments illustrate the case where a hot cathode tube or a cold cathode tube, which is one type of fluorescent tubes (linear light sources), is used as a light source. However, the present invention also includes light sources using other types of fluorescent tubes. Further, the present invention includes light sources using discharges tube (such as a mercury lamp) other than the fluorescent tube.

(16) The above-described sixth embodiment illustrates a light source using LEDs, which is one type of dot-type light source. However, the present invention also includes light sources using other types of dot-type light sources. Furthermore, planar light sources such as an organic EL may also be used.

(17) Each embodiment described above illustrates the case where one type of light source is used. However, the present invention also includes various types of light sources to be mixedly used. Specifically, a combination of a hot cathode tube and a cold cathode tube, a combination of a hot cathode tube and LEDs, a combination of a cold cathode tube and LEDs, or a combination of a hot cathode tube, a cold cathode tube, and LEDs may also be used.

(18) In each embodiment described above, each dot of the dot pattern forming the light reflecting portion of the diffuser plate has a circular shape, but the shape of each dot is not limited to this. Any shape such as an elliptical shape or a polygonal shape can be selected.

(19) Each embodiment described above illustrates the configuration in which the light reflecting portion is printed on the front surface of the diffuser plate. However, the present invention also includes a configuration using other forming means such as metal vapor deposition.

(20) In each embodiment described above, the light reflecting portion is formed on the front surface of the diffuser plate, thereby adjusting the light reflectance within the plane of the diffuser plate. However, the light reflectance of the diffuser plate itself may be adjusted in the following manner, for example. The diffuser plate typically has a configuration in which light scattering particles are dispersed in a translucent substrate. The light reflectance of the diffuser plate itself can be determined by the blending ratio (weight %) of the light scattering particles to the translucent substrate. That is, a relatively high light reflectance can be set by setting a relatively large blending ratio of the light scattering particles. A relatively low light reflectance can be set by setting a relatively small blending ratio of the light scattering particles.

(21) In each embodiment described above, the area of each dot forming the light reflecting portion is changed to thereby design and control the light reflectance of the diffuser plate. However, the present invention also includes a case where the arrangement interval of dots having the same area is changed, and a case where means for forming dots having different light reflectance, for example, is used, as control means for the light reflectance. Among these means, the dots having different light reflectance may be formed of a plurality of materials having different light reflectance, for example.

(22) Each embodiment described above illustrates the configuration in which the light reflecting portion is formed on the diffuser plate of the optical member, and the light reflectance is appropriately controlled. However, the present invention also includes a configuration in which the light reflecting portion is formed on an optical member other than the diffuser plate, and the light reflectance is appropriately controlled. The number and type of the diffuser plates and optical sheets to be used as the optical member can be changed as needed.

(23) In addition to the above-described embodiments, the screen size, the aspect ratio, and the like of the liquid crystal display device can be changed as needed.

(24) Though each embodiment described above illustrates the longitudinally mounted state in which the short-side direction of each of the liquid crystal panel and the chassis coincides with the vertical direction thereof. However, the present invention also includes a longitudinally mounted state in which the long-side direction of each of the liquid crystal panel and the chassis coincides with the vertical direction thereof.

(25) Though each embodiment described above uses TFTs as switching components of a liquid crystal display device, the present invention is also applicable to liquid crystal display devices using switching components (for example, thin film diode (TFD)) other than TFTs. The present invention is also applicable to liquid crystal display device for monochrome display other than liquid crystal display device for color display.

(26) Though each embodiment described above illustrates a liquid crystal display device using a liquid crystal panel as a display panel, the present invention is also applicable to display devices using other types of display panels.

(27) Though each embodiment described above illustrates a television receiver including a tuner, the present invention is also applicable to display devices including no tuner.

The invention claimed is:

1. A lighting device comprising: a light source; a chassis including a bottom plate arranged on a side opposite from a light exit side with respect to the light source and housing the light source; an optical member arranged on the light exit side with respect to the light source; and a reflection sheet arranged within the chassis and including a rising portion rising from a bottom plate side toward the optical member, the rising portion has a rising proximal end position and a rising distal end position, the reflection sheet being configured to reflect light, wherein:

the chassis includes a portion facing the optical member and the portion is defined in a light source arrangement area in which the light source is arranged and a light source non-arrangement area in which no light source is arranged, and the optical member has a light source arrangement area overlapping portion overlapping with the light source arrangement area and a non-arrangement area overlapping portion overlapping with the non-arrangement area, and at least a surface of the light source arrangement area overlapping portion that faces the light source has a light reflectance higher than at least a surface of the non-arrangement area overlapping portion that faces the light source; and suppose that a maximum value and a minimum value of the light reflectance on at least a surface of the optical member facing the light source are defined as Rmax and Rmin, respectively, the rising proximal end position overlaps with an area of the optical member having light reflectance R that satisfies following Expression (1), and the rising distal end position is provided not to overlap with the area of the optical member having the light reflectance R that satisfies a following Expression (1), $$(Rmax-Rmin)/2+Rmin<R \qquad (1).$$

2. The lighting device according to claim 1, wherein:
the reflection sheet includes a bottom portion that is arranged along the bottom plate and at least a part of which is arranged in the light source arrangement area; and
the rising portion is formed to rise from the bottom portion toward the optical member.

3. The lighting device according to claim 2, wherein the rising proximal end position at which the rising portion rises from the bottom portion is provided in the light source non-arrangement area.

4. The lighting device according to claim 3, wherein:
the light source has a light emitting surface configured to emit light; and
the bottom portion is arranged to face the light emitting surface.

5. The lighting device according to claim 2, further comprising a pressing member extending over the bottom portion and the rising portion and having a pressing surface pressing each of the bottom portion and the rising portion from an optical member side.

6. The lighting device according to claim 2, wherein:
the bottom plate has an end portion provided with a side plate rising to the light exit side;
the side plate has a rising end provided with an outwardly overhanging support plate; and
the rising portion has a rising end provided with an extending portion extending along the support plate.

7. The lighting device according to claim 1, wherein the rising portion is formed such that an interval held between the rising portion and the optical member decreases in a direction away from the light source.

8. The lighting device according to claim 7, wherein the rising portion has a sloped shape.

9. The lighting device according to claim 7, wherein the rising portion has an arcuate shape.

10. The lighting device according to claim 1, wherein the rising portion makes an acute angle with the bottom plate.

11. The lighting device according to claim 1, wherein the chassis includes a portion facing the optical member and the portion is defined into at least a first end portion, a second end portion provided at an end portion opposite from the first end portion, and a middle portion sandwiched between the first end portion and the second end portion, and the middle portion is defined as the light source arrangement area, each of the first end portion and the second end portion is defined as the light source non-arrangement area.

12. The lighting device according to claim 11, wherein the rising portion includes a pair of rising portions each of which is provided corresponding to each of the first end portion and the second end portion.

13. The lighting device according to claim 1, wherein at least the surface of the optical member facing the light source is configured to have light reflectance decreasing in a direction away from the light source.

14. The lighting device according to claim 1, further comprising a light reflecting portion provided on a surface of the optical member facing the light source and configured to reflect light.

15. The lighting device according to claim 14, wherein the light reflecting portion has a substantially dot shape within a surface area of the optical member facing the light source, and the light reflecting portion is formed of a number of dots each having a light reflectivity.

16. The lighting device according to claim 1, wherein:
the chassis has a rectangular shape in plan view;
the light source is formed to extend along a long-side direction of the chassis; and
the light source arrangement area and the light source non-arrangement area are arranged along a short-side direction of the chassis.

17. The lighting device according to claim 1, further comprising a receiving portion provided between the bottom plate and the rising portion and configured to receive the rising portion from the bottom plate side.

18. The lighting device according to claim 1, wherein the light source is a hot cathode tube.

19. The lighting device according to claim 1, wherein the light source is a cold cathode tube.

20. The lighting device according to claim 1, wherein the light source comprises an LED.

21. A display device comprising:
the lighting device according to claim 1; and
a display panel that performs display using light output from the lighting device.

22. The display device according to claim 21, wherein the display panel comprises a liquid crystal panel including a liquid crystal enclosed between a pair of substrates.

\* \* \* \* \*